United States Patent
Lu

(10) Patent No.: US 9,733,629 B2
(45) Date of Patent: Aug. 15, 2017

(54) CASCADED MODEL PREDICTIVE CONTROL (MPC) APPROACH FOR PLANTWIDE CONTROL AND OPTIMIZATION

(71) Applicant: Honeywell International Inc., Morristown, NJ (US)

(72) Inventor: Joseph Z. Lu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 473 days.

(21) Appl. No.: 14/336,888

(22) Filed: Jul. 21, 2014

(65) Prior Publication Data

US 2016/0018796 A1  Jan. 21, 2016

(51) Int. Cl.
*G06F 19/00* (2011.01)
*G05B 13/04* (2006.01)
*H04L 29/08* (2006.01)

(52) U.S. Cl.
CPC ............ *G05B 13/048* (2013.01); *H04L 67/12* (2013.01)

(58) Field of Classification Search
USPC .......................................................... 700/29
See application file for complete search history.

(56) References Cited

U.S. PATENT DOCUMENTS

| | | | |
|---|---|---|---|
| 5,351,184 A | 9/1994 | Lu et al. | |
| 5,561,599 A | 10/1996 | Lu | |
| 5,572,420 A | 11/1996 | Lu | |
| 5,574,638 A | 11/1996 | Lu | |
| 6,055,483 A | 4/2000 | Lu | |
| 6,122,555 A | 9/2000 | Lu | |
| 6,542,782 B1 * | 4/2003 | Lu | G05B 13/048 |
| | | | 700/29 |
| 6,993,403 B1 | 1/2006 | Dadebo et al. | |
| 7,035,704 B2 | 4/2006 | Lee | |
| 7,260,443 B2 | 8/2007 | Morinaga et al. | |
| 7,376,472 B2 * | 5/2008 | Wojsznis | G05B 11/32 |
| | | | 700/28 |
| 8,036,758 B2 * | 10/2011 | Lu | G05B 13/04 |
| | | | 700/20 |

(Continued)

OTHER PUBLICATIONS

International Search Report and Written Opinion issued for PCT/US2015/056868 with mailing date of Feb. 11, 2016, 9 pgs.

(Continued)

*Primary Examiner* — Kidest Bahta

(57) ABSTRACT

A method includes obtaining a planning model for an industrial facility at a master MPC controller and sending at least one optimization call from the master MPC controller to one or more slave MPC controllers. The method also includes receiving at least one proxy limit value from the slave MPC controller(s) in response to the at least one optimization call. The at least one proxy limit value identifies to what extent one or more process variables controlled by the slave MPC controller(s) are adjustable without violating any process variable constraints. In addition, the method includes performing plantwide optimization at the master MPC controller using the planning model and the at least one proxy limit value. The at least one proxy limit value allows the master MPC controller to honor the process variable constraints of the slave MPC controller(s) during the plantwide optimization.

20 Claims, 16 Drawing Sheets

(56) References Cited

U.S. PATENT DOCUMENTS

| | | |
|---|---|---|
| 2001/0041995 A1 | 11/2001 | Eder |
| 2002/0072828 A1 | 6/2002 | Turner et al. |
| 2003/0120361 A1 | 6/2003 | Anderson et al. |
| 2003/0130962 A1 | 7/2003 | Komiya |
| 2003/0208389 A1 | 11/2003 | Kurihara et al. |
| 2004/0133616 A1 | 7/2004 | Manevitz et al. |
| 2004/0158339 A1 | 8/2004 | Kawase et al. |
| 2004/0267394 A1 | 12/2004 | Kempf et al. |
| 2005/0044026 A1 | 2/2005 | Leistner |
| 2005/0246045 A1 | 11/2005 | Sugihara et al. |
| 2006/0136275 A1 | 6/2006 | Cotora |
| 2006/0142886 A1 | 6/2006 | Ishibashi et al. |
| 2007/0050070 A1 | 3/2007 | Strain et al. |
| 2007/0083281 A1 | 4/2007 | Chen et al. |
| 2007/0260335 A1 | 11/2007 | Fan et al. |
| 2008/0109329 A1 | 5/2008 | Fichtinger et al. |
| 2008/0140439 A1 | 6/2008 | Hoffman |
| 2008/0172280 A1 | 7/2008 | Goulimis |
| 2008/0215386 A1 | 9/2008 | Eder |
| 2009/0043546 A1 | 2/2009 | Srinivasan et al. |
| 2009/0105636 A1 | 4/2009 | Hayter et al. |
| 2009/0187265 A1 | 7/2009 | Wan et al. |
| 2009/0265021 A1* | 10/2009 | Dubay .................. G05B 13/04 700/33 |
| 2009/0319070 A1* | 12/2009 | Morningred .......... G06Q 10/06 700/103 |
| 2010/0010845 A1 | 1/2010 | Kuhn et al. |
| 2010/0023162 A1 | 1/2010 | Gresak et al. |
| 2010/0036181 A1 | 2/2010 | Diebold et al. |
| 2010/0042455 A1 | 2/2010 | Liu et al. |
| 2010/0301273 A1 | 12/2010 | Blasiak et al. |
| 2011/0131017 A1 | 6/2011 | Cheng et al. |
| 2011/0135034 A1 | 6/2011 | Mujica et al. |
| 2011/0224830 A1 | 9/2011 | Jia et al. |
| 2013/0282146 A1 | 10/2013 | Lu |
| 2014/0128996 A1* | 5/2014 | Sayyarrodsari ........ G05B 17/02 700/29 |

OTHER PUBLICATIONS

International Preliminary Report on Patentability dated Feb. 14, 2012 in connection with International Application No. PCT/US2010/044116; 5 pages.

Årzén, Karl-Erik, et al.; "Integrated control and scheduling"; Report ISRN LUTFD2/TFRT-7586-SE; Department of Automatic Control (1999); 52 pages.

Bodington, C. Edward; "Planning, scheduling, and control integration in the process industries"; New York: McGraw-Hill; Chapter 13; 4 pages.

Grossmann, et al; "Research challenges in process systems engineering": AIChE Journal 46.9 (2000); 7 pages.

Harjunkoski, et al.: "Integration of scheduling and control—Theory or practice?"; Computers & Chemical Engineering 33.12 (2009); 10 pages.

Nath, et al.; "Dynamic real-time optimization and process control of twin olefins plants at DEA Wesseling Refinery"; 13th Annual Ethylene Producers Conf.; Apr. 2001; 25 pages.

Qin, et al.; "A survey of industrial model predictive control technology"; Control Engineering Practice 11.7 (2003); 32 pages.

Qin, et al.; "An overview of industrial mode; predictive control technology"; AIChE Symposium Series. vol. 93. No. 316; American Institute of Chem Engineers; 31 pages.

Reynolds, et al.; "Advanced Process Control & On-Line Optimization: Global Market Research Study"; Mkt Analysis & Forcast through 2017; ARC Advisory Group; 2012; 196 pages.

Shobrys, et al.; "Planning, scheduling and control systems: why cannot they work together"; Computer & Chemical Engineering 26.2 (2002); 12 pages.

* cited by examiner

CASCADED MODEL PREDICTIVE CONTROL (MPC) APPROACH FOR PLANTWIDE CONTROL AND OPTIMIZATION

TECHNICAL FIELD

This disclosure relates generally to industrial process control and automation systems. More specifically, this disclosure relates to a cascaded model predictive control (MPC) approach for plantwide control and optimization.

BACKGROUND

Processing facilities are often managed using industrial process control and automation systems. Many control and automation systems include multiple hierarchical layers that perform different functions. For example, lower layers could include devices that perform process control functions and model predictive control (MPC) operations, while higher layers could include devices that provide plantwide optimization solutions.

Ideally, control and plantwide optimization would be designed jointly, but one problem that arises is how to simultaneously provide decentralized controls at lower levels and centralized optimization at higher levels. Decentralized MPC solutions are often more desirable because of their operability and flexibility in dealing with process upsets, equipment failures, and maintenance. Centralized planning optimization is often more desirable because its higher-level view distills out unessential or obscuring details. However, one drawback of conventional control and automation systems lies in the lack of guaranteed solution consistency across multiple layers. In practice, plantwide planning optimization is rarely if ever implemented as part of a closed-loop control system. As a result, a significant amount of optimization benefits remains unreachable.

SUMMARY

This disclosure provides a cascaded model predictive control (MPC) approach for plantwide control and optimization.

In a first embodiment, a method includes obtaining a planning model for an industrial facility at a master MPC controller. The method also includes sending at least one optimization call from the master MPC controller to one or more slave MPC controllers. The method further includes receiving at least one proxy limit value from the one or more slave MPC controllers at the master MPC controller in response to the at least one optimization call. The at least one proxy limit value identifies to what extent one or more process variables controlled by the one or more slave MPC controllers are adjustable without violating any process variable constraints. In addition, the method includes performing plantwide optimization at the master MPC controller using the planning model and the at least one proxy limit value. The at least one proxy limit value allows the master MPC controller to honor the process variable constraints of the one or more slave MPC controllers during the plantwide optimization.

In a second embodiment, an apparatus includes a master MPC controller having at least one memory configured to store a planning model for an industrial facility, at least one network interface configured to communicate with one or more slave MPC controllers, and at least one processing device. The at least one processing device is configured to initiate transmission of at least one optimization call to the one or more slave MPC controllers and receive at least one proxy limit value from the one or more slave MPC controllers in response to the at least one optimization call. The at least one proxy limit value identifies to what extent one or more process variables controlled by the one or more slave MPC controllers are adjustable without violating any process variable constraints. The at least one processing device is also configured to perform plantwide optimization using the planning model and the at least one proxy limit value. The at least one processing device is configured to honor the process variable constraints of the one or more slave MPC controllers during the plantwide optimization using the at least one proxy limit value.

In a third embodiment, a non-transitory computer readable medium embodies a computer program. The computer program includes computer readable program code for obtaining a planning model for an industrial facility at a master MPC controller. The computer program also includes computer readable program code for sending at least one optimization call from the master MPC controller to one or more slave MPC controllers. The computer program further includes computer readable program code for receiving at least one proxy limit value from the one or more slave MPC controllers at the master MPC controller in response to the at least one optimization call. The at least one proxy limit value identifies to what extent one or more process variables controlled by the one or more slave MPC controllers are adjustable without violating any process variable constraints. In addition, the computer program includes computer readable program code for performing plantwide optimization at the master MPC controller using the planning model and the at least one proxy limit value. The at least one proxy limit value allows the master MPC controller to honor the process variable constraints of the one or more slave MPC controllers during the plantwide optimization.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 17, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
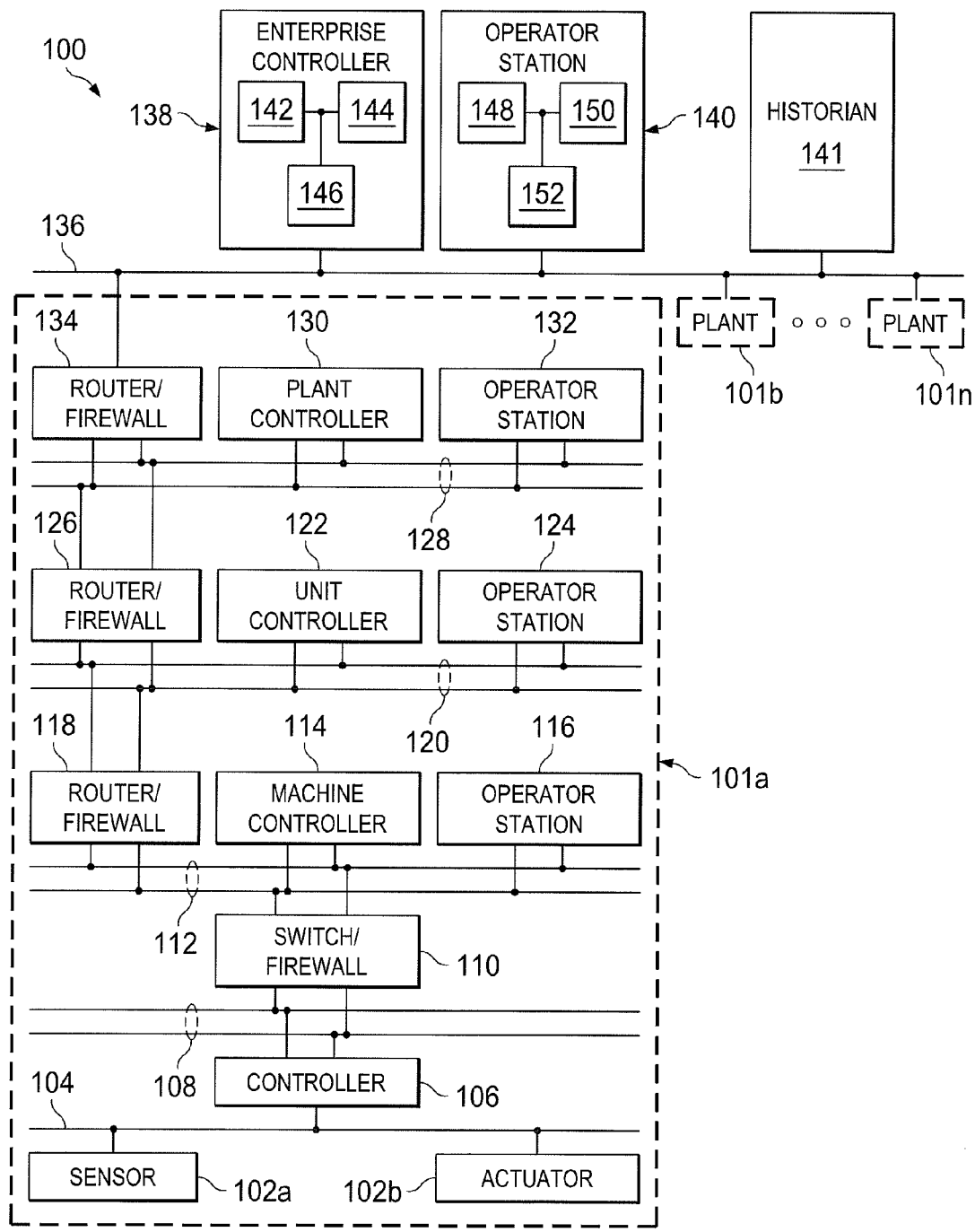
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the teem "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

Over the past several decades, MPC has become the standard multivariable control solution for many industries. The widespread use of MPC has set a solid foundation for a more economically-significant advancement, namely closed-loop plantwide optimization. However, many technical, workflow, and user-experience challenges exist in attempting to provide closed-loop plantwide optimization for most industries. As a result, open-loop plantwide optimization, commonly known as production planning, is still performed. In practice, plantwide planning optimization is rarely if ever implemented as part of a closed-loop control system. In fact, in many industries, planning results are often manually (and hence non-optimally) adjusted through mediating instruments such as daily operator instruction sheets. Because of this, a significant amount of manufacturing profit remains unobtainable.

In some industries, a mediating solution layer, such as an open-loop production scheduler, has been devised to disaggregate a production plan into smaller executable pieces. This scheduler assists the translation of a planning solution into operator actions, but it does not eliminate manual adjustments. In other industries, an open-loop production scheduler has been used in place of production planning, but its output targets are often manually adjusted, as well.

The practice of manually adjusting an open-loop solution often stems from the need to translate or revise high-level production targets in order to (i) satisfy low-level (possibly safety-related) control constraints in process units and (ii) compensate for disturbances to production inventories or product qualities (called "unplanned events" in planning terminology). The technical difficulties involved in manual translation, to a large extent, coincide with the difficulties involved in integrating multi-level solutions that use models at different scales.

This disclosure provides a cascaded MPC solution for plantwide control and optimization, which helps to provide plantwide optimization as part of an automatic control and automation system. As described below, a "master" MPC controller is configured to use a planning model, such as a single-period planning model or other suitable reduced model(s), as a seed model. The master MPC controller performs plantwide economic optimization using its optimizer to control production inventories, manufacturing activities, or product qualities inside a plant. The master MPC controller is cascaded on top of one or more slave MPC controllers. The slave MPC controllers could, for example, represent controllers at the unit level (Level 3) of a system, and each slave MPC controller provides the master MPC controller with its operating states and constraints. Because of this, a plantwide optimization solution from the master MPC controller can honor all unit-level operating constraints from the slave MPC controllers. Jointly, the MPC cascade simultaneously provides both decentralized controls (such as at the unit level) and centralized plantwide optimization (such as at the plant level) in a single consistent control system. The phrases "plantwide optimization" or "plantwide control" refers to optimization or control of multiple units in an industrial facility, regardless of whether those multiple units represent every single unit in the industrial facility.

In this way, this MPC cascade solution enables embedded real-time planning solutions to honor lower-level operating constraints. By cross-leveraging both planning and control models online, the MPC cascade solution makes it possible to run a "reduced-horizon" form of planning optimization within a closed-loop control system in real-time. Among other things, the MPC cascade solution can be used to automatically carry out just-in-time production plans through its slave MPC controllers. The formulation of the reduced-horizon planning optimization in the master MPC controller could be similar or identical to that of a single-period planning optimization as used in offline planning tools but typically with its time-horizon shortened, such as between one and fourteen days.

The remaining description in this patent document is divided as follows. A multiscale model that can be used in industrial process control and automation settings is described, and an MPC cascade solution using the multiscale models is provided. A conduit for merging multiscale models in the form of a proxy limit is described, and a multiscale solution for improving a user's experience is provided. Further, the use of contribution values and contribution costs as a way to cast a central economic objective function to the prices/costs of intermediate streams is disclosed, and model structures that can be used in certain systems using MPC cascade solutions are described. Finally, a model validation technique is provided, and techniques for handling master-slave variables in MPC cascade solutions are disclosed.

Although FIG. 1 illustrates one example of an industrial process control and automation system 100, various changes may be made to FIG. 1. For example, a control and automation system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which an MPC cascade solution can be used. This functionality can be used in any other suitable device or system.

Multiscale Model

Consider an industrial plant having multiple units. At a high level, the overall material, component, and energy balances among all process units should be established. At a low level, each unit should be properly controlled to ensure safety in the plant and smooth efficient operation of the unit.

Figure 2A:
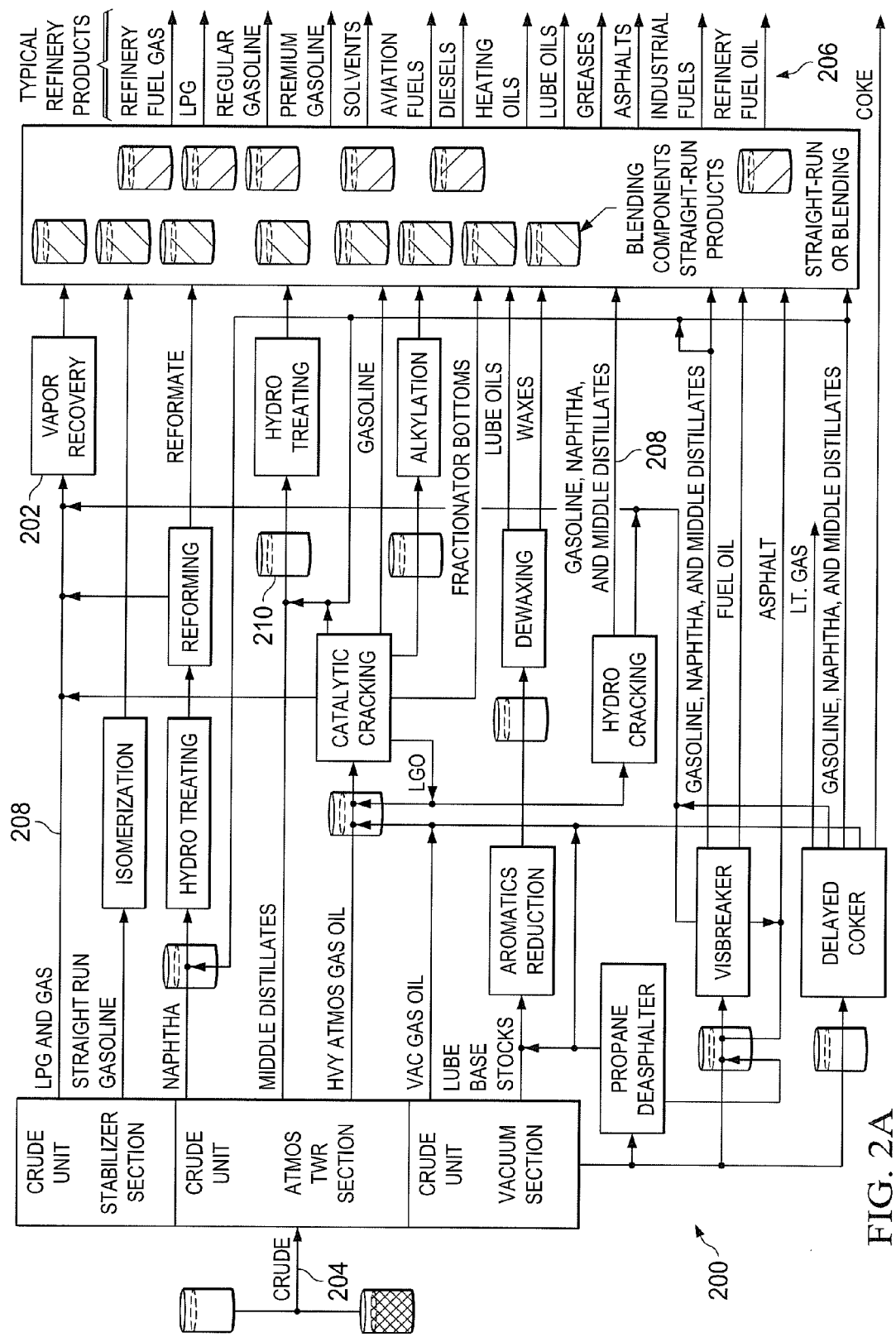
FIGS. 2A and 2B illustrate example planning and model predictive control (MPC) models used to support a cascaded MPC approach in an industrial process control and automation system according to this disclosure.
Figure 2B:
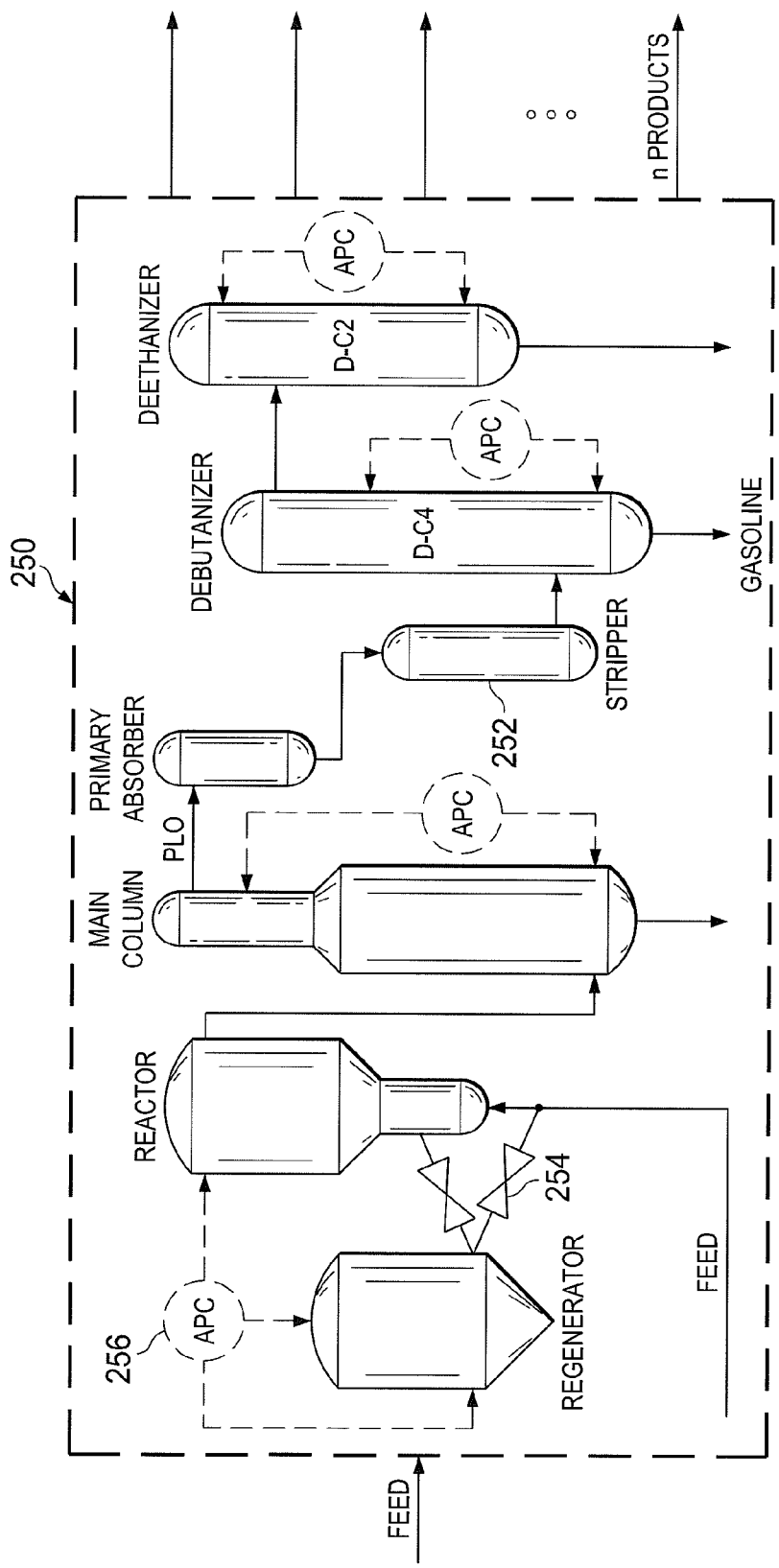

Planning and MPC models are an example of a multiscale model pair that could be used to solve multi-level problems in a cascaded MPC architecture. FIGS. 2A and 2B illustrate example planning and MPC models used to support a cascaded MPC approach in an industrial process control and automation system according to this disclosure. In particular, FIG. 2A represents a yield-based planning model 200, and FIG. 2B represents an MPC model 250.

As shown in FIG. 2A, the planning model 200 identifies multiple units 202, which generally operate to convert one or more input streams 204 of feed materials into one or more output streams 206 of processed materials. In this example, the units 202 denote components in an oil and gas refinery that convert a single input stream 204 (crude oil) into multiple output streams 206 (different refined oil/gas products). Various intermediate products 208 are created by the units 202, and one or more storage tanks 210 could be used to store one or more of the intermediate products 208. As shown in FIG. 2B, the MPC model 250 identifies multiple components 252 of a single unit. Various valves and other actuators 254 can be used to adjust operations within the unit, and various APCs and other controllers 256 can be used to control the actuators within the unit.

In general, a planning model 200 looks at an entire plant (or portion thereof) with a "bird's eye" view and thus represents individual units on a coarse scale. A planning model 200 focuses on the inter-unit steady-state relationships pertaining to unit productions, product qualities, material and energy balances, and manufacturing activities inside the plant. A planning model 200 is typically (but not always) composed of process yield models and product quality properties. A planning model 200 can be constructed from a combination of various sources, such as planning tools, scheduling tools, yield validation tools and/or historical operating data. An MPC model 250, however, represents at least one unit on a finer scale. An MPC model 250 focuses on the intra-unit dynamic relationships between controlled variables (CVs), manipulated variables (MVs), and disturbance variables (DVs) pertaining to the safe, smooth, and efficient operation of a unit. The time scales of the two models 200, 250 are also different. An MPC model's time horizon typically ranges from minutes to hours, while a planning model's time horizon typically ranges from days to months. Note that a "controlled variable" generally denotes a variable whose value is controlled to be at or near a setpoint or within a desired range, while a "manipulated variable" generally denotes a variable that is adjusted in order to alter the value of at least one controlled variable. A "disturbance variable" generally denotes a variable whose value can be considered but not controlled or adjusted.

A planning model 200 often can and should exclude non-production-related or non-economically-related variables, such as pressures, temperatures, tank levels, and valve openings within each unit. Instead, a planning model 200 can reduce a process unit to one or several material or energy yield vectors. The MPC model 250, on the other hand, typically includes all of the operating variables for control purposes in order to help ensure the safe and effective operation of a unit. As a result, the MPC model 250 includes many more variables for a unit compared to the planning model 200. As a specific example, an MPC model 250 for an oil refinery's Fluidized Catalytic Cracking Unit (FCCU) could contain about 100 CVs (outputs) and 40 MVs (inputs). The planning model 200 of the same unit could focus only on key causal relationships between the feed quality and operating modes (as inputs) and the FCCU product yield and quality (as outputs), so the planning model 200 could have as few as three or four inputs and ten outputs. This variable difference has conventionally been a barrier to effectively integrating multi-level solutions. Additional differences are summarized in Table 1 below, which compares the typical focuses of the two models 200, 250.

TABLE 1

| Model Type | Users | Purpose & Advantages | Typical Tasks | Typical Decision Variables | Time Scale |
|---|---|---|---|---|---|
| Yield model | Planning personnel and others | Plantwide or multi-site<br>Sharp focus on key economic factors and inter-unit material and energy balances<br>Bird's eye (compact) view of plantwide operations<br>Free of unnecessary or obscuring details | Produce the right amounts and at the right specs<br>Coordinate the productions among different units<br>Satisfy inventory (and possibly other logistic) inter-unit constraints | Plant/unit material flow configurations<br>Unit feed rates, operating modes and/or severities<br>Feed choices<br>Product mix<br>Buy vs. sell decisions | Longer time horizon<br>Less frequently executed<br>Open-loop<br>MPC |
| MPC model | APC and process engineers | Intra-unit or multi-unit<br>Sharp focus on safety, operability and product quality of a process unit<br>Unit-level efficiency is a secondary goal | Control all safety and operability related CVs<br>Control product quality within specs<br>Operate the unit at a desirable operating point | Flows, including unit feed rates<br>Temperatures<br>Pressures<br>Levels<br>Pump arounds | Shorter time horizon<br>More frequently executed<br>Closed-loop |

There are several advantages of using a coarse-scale planning model 200. For example, plantwide economic optimization can be compactly and clearly formulated using a planning model 200 without getting entangled with possibly-obscuring details inside any single process unit. Also, a divide-and-conquer approach can be employed to solve a high-level optimization problem first and then find a way to pass the solution down to each unit.

While a compact well-built planning model 200 makes a planning problem easy to set up, clear to view, and quick to solve, it comes with a drawback—it has no visibility of the detailed variables inside any unit. Although many of these detailed variables may have little to do with high-level production planning, a small subset usually does. When a planning model 200 has no visibility inside any lower-level unit, it cannot guarantee that its solution, optimal or not, will honor lower-level constraints of all units. This is one reason why a conventional planning solution often needs to be manually translated or revised to accommodate operating constraints inside the units, and a significant profit margin can be lost in the translation. The same can be said for a scheduling solution if it uses a yield-based planning model 200 that is at a coarse scale.

From a holistic perspective, an optimization or control problem formulated with a high-level yield-based planning model 200 could benefit from low-level MPC models 250. The rationale is that the details used for guaranteeing constraint satisfaction in a unit are typically already in the unit's MPC model 250, although these details are not necessarily organized in the right model format. Ideally, an MPC model 250 can be used to supplement the details of a unit's constraints for planning on an as-needed basis. The cascaded MPC approach described below provides a structural framework in which MPC models can be effectively used to supply low-level fine-scale model information to high-level coarse-scale plantwide optimization formulation or control formulation. The cascaded MPC approach described below can make use of planning models 200 and MPC models 250 to provide this functionality.

Cascaded MPC Solution Using Multiscale Models

From a plantwide perspective, control and planning are often coupled. Planning typically relies on control to establish a feasible region for optimization, while control typically relies on planning to coordinate units and run an entire plant at its highest possible profitable operating point. Planning therefore often depends on MPC controllers to push constraints inside each unit to create a bigger feasible region for plantwide optimization. Meanwhile, MPC controllers often depend on guidance from planning before the MPC controllers know which constraints are truly plantwide bottlenecks and should thus be pushed and which constraints are not and could remain inactive. These two solution layers therefore co-depend on each other and should be treated simultaneously.

One way to solve this coupled problem is to design the control and plantwide optimization jointly. Since each MPC controller has an embedded economic optimizer, a single large plantwide MPC controller that performs both plantwide optimization and unit-level MPC control could be devised. However, such a monolithic all-or-nothing MPC solution has various drawbacks. One challenge of any joint design approach has been simultaneously providing decentralized controls at lower levels and centralized optimization at higher levels.

Figure 3A:
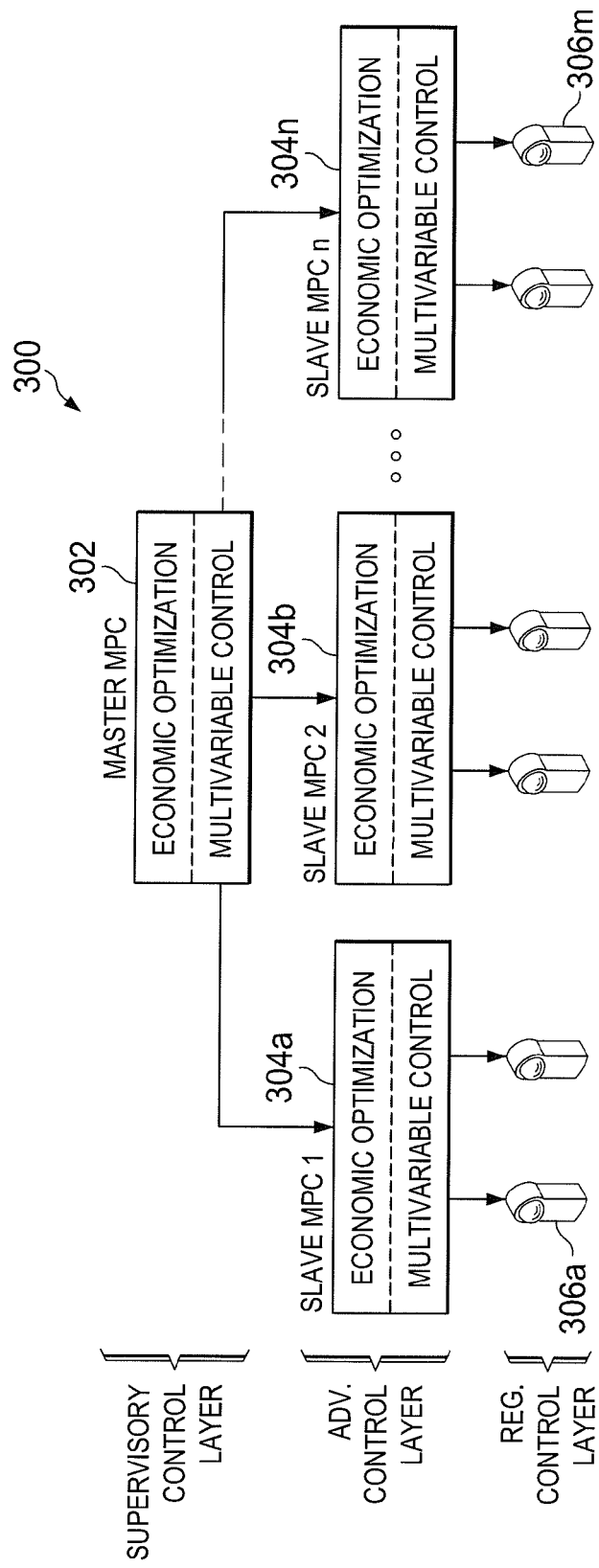
FIGS. 3A and 3B illustrate an example cascaded MPC architecture for an industrial process control and automation system according to this disclosure.
Figure 3B:
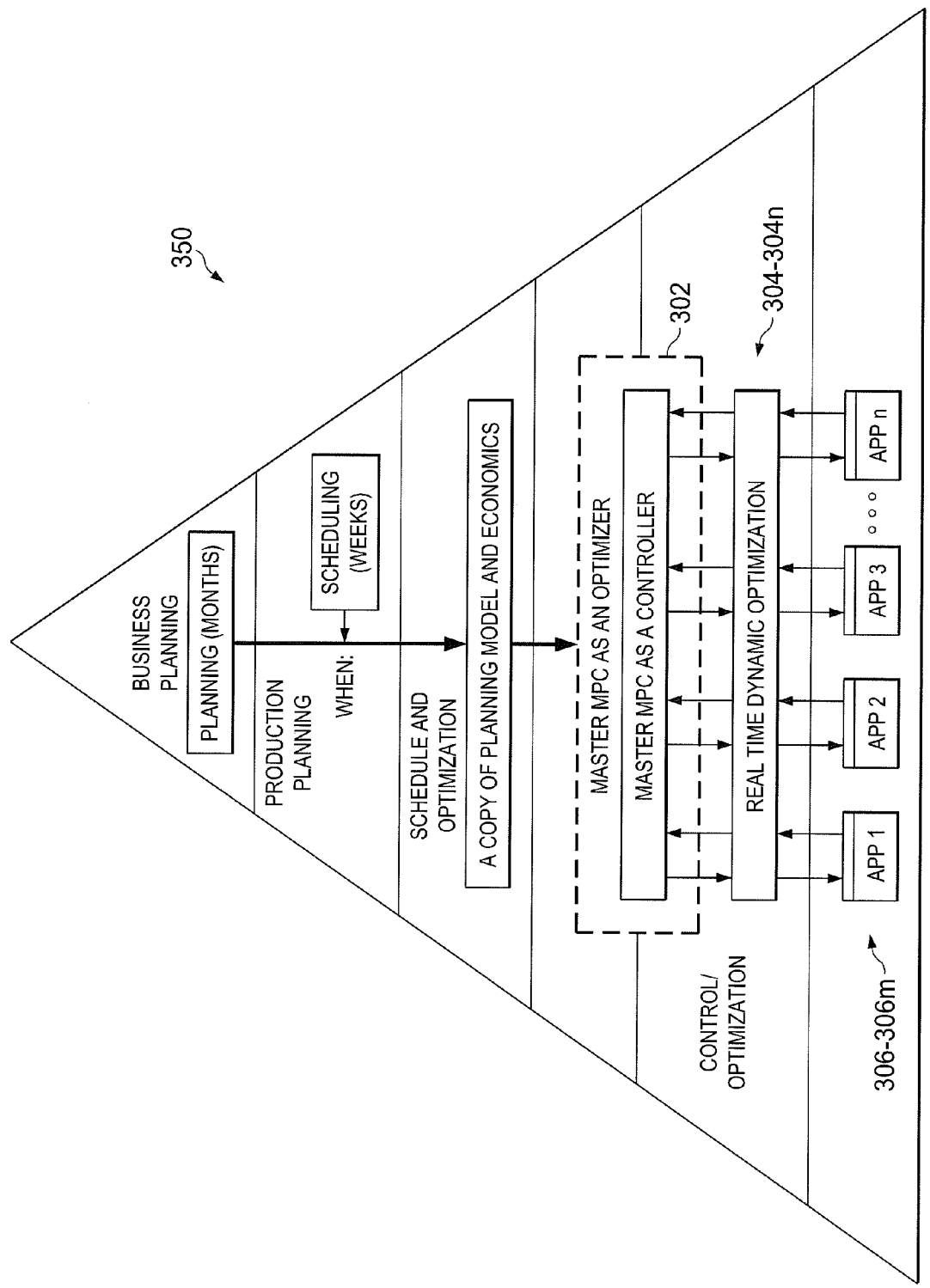

FIGS. 3A and 3B illustrate an example cascaded MPC architecture 300 for an industrial process control and automation system according to this disclosure. As shown in FIG. 3A, the cascaded architecture 300 includes a master MPC controller 302 and one or more slave MPC controllers 304a-304n. The slave MPC controllers 304a-304n interact with one or more regular process controllers 306a-306m. The slave MPC controllers 304a-304n could denote Level 3 controllers, while the process controllers 306a-306m could denote Level 2 controllers.

Each MPC controller 302, 304a-304n supports economic optimization and multivariable control functions. The master MPC controller 302 uses a planning model 200 (such as a yield-based single-period planning model) to provide an initial steady-state gain matrix, and relevant model dynamics can be determined using operating data of the plant (such as historical data). The master MPC controller 302 operates to control product inventories, manufacturing activities, or product qualities within the plant. The embedded economic optimizer of the master MPC controller 302, which is furnished with the same planning model structure and economics, could therefore reproduce the single-period offline planning optimization but in an online and real-time manner.

The master MPC controller 302 cascades on top of n slave MPC controllers 304a-304n (n is an integer value greater than or equal to one). The slave MPC controllers 304a-304n provide the master MPC controller 302 with future predictions and operating constraints for each unit of a plant. With this information, a real-time planning solution from the cascaded architecture 300 reduces or eliminates the drawbacks discussed above. Jointly, the MPC controllers 302, 304a-304n provide simultaneously decentralized controls at lower levels with fine-scale MPC models 250 and centralized plantwide optimization at higher levels with a coarse-scale planning model 200, all in one consistent cascaded control system.

Another reason a production plan often needs to be manually converted into a set of operating instructions is that an open-loop planning solution has a time horizon that typically ranges from several days to a week (for a single period), and it is commonly executed only once a day or once every several days. Thus, it lacks an effective feedback mechanism to deal with uncertainties, such as changes in feed quality or in ambient conditions, process unit upsets, heating or cooling capacity limitations, and maintenances. In order to help deal with these situations, an optimizer is embedded in the master MPC controller 302, and the optimizer can execute at a user-defined frequency, such as one ranging from once every several minutes to once an hour. Both production quantities and qualities of each unit can be measured or estimated at that frequency, and prediction errors can be bias-corrected in the master MPC controller 302 as in any standard MPC. If any deviations from the original optimal plan are detected, a plantwide re-optimization can take place immediately. The new optimal production targets can then be sent to and get carried out by the slave MPC controllers 304a-304n, reducing or eliminating the need for manual translation or adjustment.

Certain optimization settings can also be modified from conventional MPC optimization settings in order to capture additional benefits in real-time. Some similarities and differences between the traditional MPC approach and the cascaded MPC solution could include the following:

The objective function can remain the same as in the offline planning counterpart.

The time horizon in the master MPC controller 302 can be an online tuning parameter, such as one ranging from several hours to several days or weeks, and it can be shorter than the time horizon used in offline (particularly multi-period) planning.

The tuning can be set to capture more benefits in the form of just-in-time manufacturing. Considerations for tuning may include (as examples) how far in advance product orders are placed, the variance of product orders (both in quantities and grades), what additional buy/sell opportunities can be pursued, and what semi-finished components can be exchanged with partners or bought/sold on the spot market.

Production inventories and product properties can be controlled dynamically with real-time measurement feedback.

Product orders within the time horizon are known, as opposed to being estimated in the offline counterpart. The master MPC controller 302 can produce a just-in-time production plan as opposed to a plan based on assumed orders.

The planning model 200 used in the master MPC controller 302 can be updated in real-time with a yield validation mechanism associated with the slave MPC controllers 304a-304n. After cross-validation (such as for metering errors), measured yields can be used to update the planning model 200, and the master MPC controller 302 can generate a more accurate profitable production plan.

The cascaded architecture 300 provides a control hierarchical view 350 as shown in FIG. 3B. The cascaded architecture 300 breaks down partitioning lines in a conventional control and automation system by obtaining a copy of the planning model 200 and grafting it onto an MPC controller by adding delays and ramps. Unit feed rates can be used as MVs, and production inventories can be used as CVs at the master MPC controller 302. The master MPC controller 302 is a real-time plan executor that understands the big picture from the planning model 200 and uses each unit's MPC models 250 for advanced process control. The master MPC controller 302 can therefore optimize the plant in concert with the slave MPC controllers 304a-304n, generating the best-achievable plan while honoring all units' constraints.

The planning model 200 used by the master MPC controller 302 can be thought of as containing two parts, namely (i) a dynamic model for MPC control and (ii) a steady-state model for economic optimization (which is the steady-state part of the dynamic model). The master MPC controller 302 reproduces the offline planning optimization as closely to the original plan as makes sense in real-time by leveraging MPC feedback to improve the accuracy of the offline planning optimization, thereby incorporating real-time information that was not available before. The dynamics of the master MPC controller's model 200 can be identified from the plant's operating data, and the master MPC controller 302 can provide the desired inventory/property controls in closed-loop. Because the control and optimization solutions from the master MPC controller 302 honor the operating constraints from the slave MPC controllers 304a-304n, this enables the master MPC controller 302 to run in the closed-loop and makes the MPC cascade possible. This is done while providing both centralized compact plant-level optimization and unit-level decentralized MPC controls.

The multivariable control functionality of the master MPC controller 302 can represent a type of production controller or inventory controller that uses inventory levels as its main CVs ("inventory" here refers to an accumulative amount of material/energy/etc. at a current state, at a predicted future state, or both). Each unit change rate (or MV) can be configured directly through the master MPC controller 302, indirectly via a slave MPC controller 304a-304n, or indirectly via a process controller 306a-306m (such as an RMPCT controller). Each slave MPC controller 304a-304n can predict the "room left" in each unit's change rate (via proxy limits described below), and the master MPC controller 302 can refrain from requesting a change rate that the unit cannot accept. The master MPC controller 302 can further include CVs for material/energy balance (models/constraints).

The master MPC controller 302 includes any suitable structure for performing economic optimization operations using a planning model. The master MPC controller 302 could, for example, represent a single input single output (SISO) controller, a multiple input multiple output (MIMO) controller, or a controller with other numbers of inputs and outputs. Each slave MPC controller 304a-304n includes any suitable structure for interacting with a master MPC controller. Each slave MPC controller 304a-304n could, for instance, represent a SISO controller, a MIMO controller, or a controller with other numbers of inputs and outputs.

Proxy Limits

The master MPC controller 302 is an independent MPC controller using a reduced model. In order for the master MPC controller 302 to cascade over the slave MPC controllers 304a-304n, the master MPC controller 302 honors the constraints of the slave controllers 304a-304n, or the overall combined solution may not be optimal or even feasible to implement. To help avoid this situation, a proxy limit is used to merge multiscale models. A proxy limit is an alternative representation of a slave MPC controller's constraint(s) in the master MPC controller's space. Proxy limits can be viewed as conduits between individual slave MPC controllers and the master MPC controller to "transport" the slave MPC controllers' constraints to the master MPC controller. Proxy limits from multiple slave MPC controllers 304a-304n can be combined and included in the master MPC controller's control and economic optimization formulations.

Proxy limits can be expressed in the MV space of the master MPC controller 302, but their boundary values can be computed in the MV space of the slave MPC controllers 304a-304n. For each MV of the master MPC controller 302, each of its downstream slave MPC controllers can predict the amount of distance it could move before one or more slave CVs or MVs would reach their operating limits. When two or more MVs from the master MPC controller 302 are associated with a slave MPC controller 304a-304n, the proxy limits can be multivariate in nature.

Figure 4:
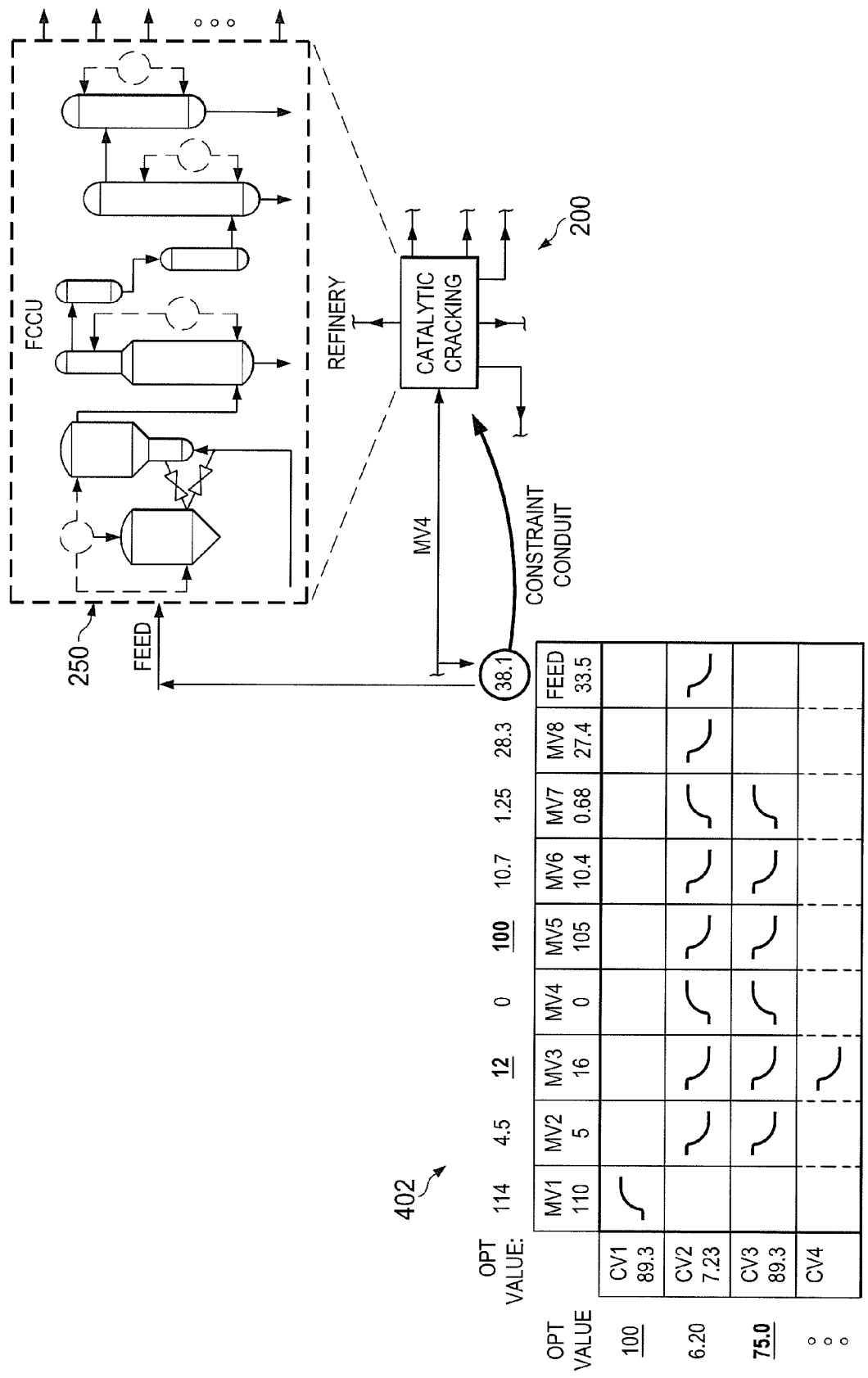
FIG. 4 illustrates an example use of a proxy limit in a cascaded MPC architecture according to this disclosure.

FIG. 4 illustrates an example use of a proxy limit in a cascaded MPC architecture according to this disclosure. In particular, FIG. 4 illustrates an example use of a proxy limit in the cascaded architecture for an FCCU, where one proxy limit can sufficiently represent the entire unit. Suppose that the FCCU's feed is configured as MV4 in the planning model 200 for the master MPC controller 302 and as MV9 in the MPC model 250 for the slave MPC controller 304a. Also, assume that the current feed rate to the unit has a value of 33.5. Further assume that the slave MPC controller 304a predicts that the feed rate could be increased up to a maximum value of 38.1 before one or more slave CVs and/or MVs would hit one or more limits as shown in table 402. The table 402 here shows different CVs controlled by the slave MPC controller 304a and different MVs used by the slave MPC controller 304a to control those CVs. The maximum boundary value of 38.1 is passed to the master MPC controller 302 and used as a high proxy limit for the master MPC controller's MV4.

In each unit, regardless of how many slave constraints can limit a master MPC controller's MV (such as the unit feed rate), the master MPC controller 302 only needs to know the point where it should stop pushing its MV (otherwise some lower-level constraint violation can result). This stopping point coincides with the proxy limit, which represents the entire set of active slave constraints in the corresponding low-level unit that can limit the master MPC controller's MV. In the specific example above, only one proxy limit is needed for all slave constraints in the low-level FCCU unit, although multiple proxy limits could also be used.

One feature of proxy limits is that all slave MPC constraints in a unit can be distilled into one or several proxy limits. The proxy limits therefore function as a bonding mechanism for keeping the coarse-scale model 200 intact in the master MPC controller 302 while merging it effectively with the fine-scale slave MPC models 250. In other words, this makes it possible to keep the plantwide optimization problem inside the master MPC controller 302 in its original compact planning format without forcing the coarse-scale model 200 to be expanded into a compatible fine-scale model.

With the help of proxy limits, the joint optimization solution using the cascaded MPC approach provides various benefits. For example, the embedded real-time planning solution honors unit-level operating constraints in the slave MPC controllers 304a-304n, and the master MPC controller 302 dynamically controls the same set of variables (such as inventories or qualities) that an offline planning tool would manage in open loop. Effectively, all relevant MPC constraints in a unit are distilled into one or more proxy limits, which in turn are included in the master MPC controller's optimization. Moreover, proxy limits make the layered-optimization more attractive than a single layer. In addition, the practice of manual adjustment or translation of an open-loop optimization solution can be reduced or eliminated. By cross-leveraging both planning and control models online, the cascaded MPC approach makes it possible to run plantwide optimization within a closed-loop control system in real-time. It thus provides simultaneously a centralized optimization with a coarse-scale planning model 200 at the plant level and decentralized controls with fine-scale MPC models 250 at the unit level.

Note that the concept of MPC cascading with proxy limits has been described as being performed with Level 3 MPC controllers as the slave controllers. However, this concept can be used with or extended to different levels of a control and automation system. For example, master MPC controllers in multiple cascaded architectures 300 within a plant could form slave MPC controllers for a plant-level master MPC controller. As a particular example, the plant-level master MPC controller for an oil/gas refinery could use a simple yield vector (crude oil as one input feed and refined products as multiple output feeds). Similarly, multiple plant-level master MPC controllers could function as slave MPC controllers to an enterprise-level master MPC controller. As a particular example, if different refineries are associated with different markets, an enterprise-level master MPC controller over multiple refineries could compute global optimum values based on regional product demands/supply and each refinery's production capacity in real-time.

Multiscale Solution for Improving User Experience

Figure 5:
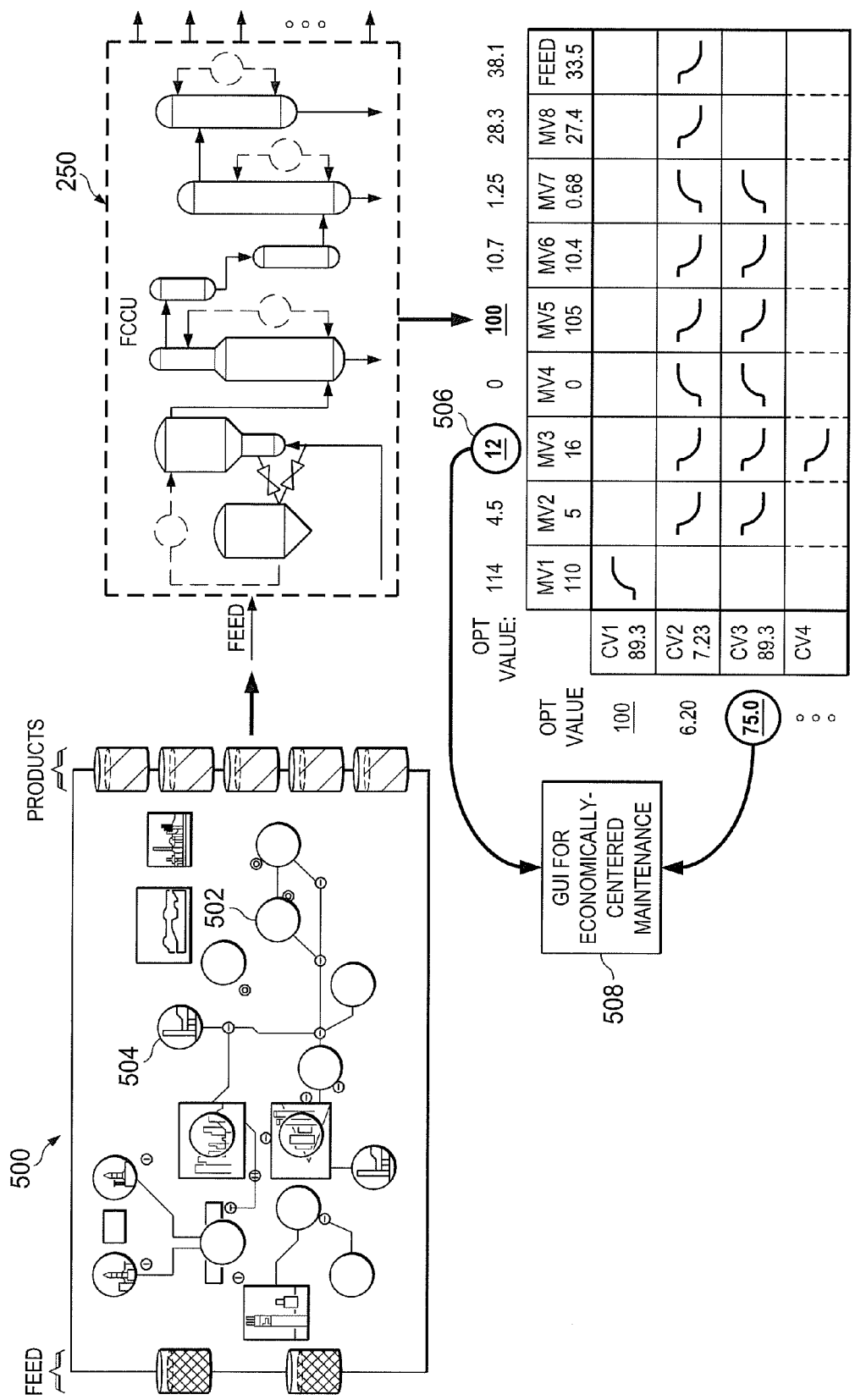
FIG. 5 illustrates an example graphical user interface (GUI) for use with a cascaded MPC architecture according to this disclosure.

Since the cascaded MPC architecture 300 uses a pair of models, the planning model 200 can naturally be used to provide a graphical user interface (GUI) with a clear bird's eye view of a plant. FIG. 5 illustrates an example GUI 500 for use with a cascaded MPC architecture according to this disclosure. The GUI 500 includes various icons 502 identifying different units 202 within the planning model 200. The master MPC controller 302 can provide various information within the GUI 500. For example, the master MPC controller 302 could provide unit production rates, available inventories, scheduled product deliveries, cost structures, total profit margins, each unit's contribution to the profit margin, and other relevant information pertaining to the real-time execution of a production plan.

The master MPC controller 302 also allows an operator to easily identify within the GUI 500 which units are plantwide bottlenecks by looking at their proxy limits. Any unit 202 with at least one active proxy limit is a global bottleneck, such as when the unit's throughput is actually constrained by low-level constraints inside its slave MPC controllers. These units can be graphically identified using indicators 504, such as colored circles, in the GUI 500 to provide a clear "at a glance" view. A marginal profit value could optionally be displayed next to each bottleneck unit to indicate the incremental amount of profit that the plant could achieve if the unit's throughput is increased.

The operator (such as a production manager or planner) can use the GUI 500 to drill down into a bottleneck unit. For example, if a particular icon 502 in the GUI 500 is selected, the MPC model 250 for the selected unit 202 could be displayed to the operator. The displayed MPC model 250 represents a slave MPC controller's GUI, which shows active constraints that are currently limiting the unit's production throughput. If a particular controller in the MPC model 250 is selected, the table 402 could be displayed to the operator.

Variables in the table 402 that are currently acting as constraints (such as due to equipment or maintenence issues) could be identified using indicators 506 (such as colored circles). If a particular variable in the table 402 is selected by the operator, a maintenance GUI 508 or other interface could be presented to the operator. For instance, the operator could select a valve constraint and view a maintenance GUI 508 for that valve. The maintenance GUI 508 could indicate that the valve is scheduled for maintenance in two weeks. As with the master MPC controller 302, a slave MPC controller 304a-304n could display a marginal profit value next to each active constraint in the table 402 to indicate the incremental amount of profit that the plant could achieve if the constraint was relieved (which in turn would help increase the throughput).

In a complex facility, there is typically a long list of actuators and other equipment that need to be serviced at any given time. Maintenance personnel often do not have adequate guidance to prioritize their maintenance tasks. The same can be said about APC maintenance tasks and other maintenance tasks. In the manner shown in FIG. 5, each maintenance task can be tagged with an incremental profit amount, and the task list can be easily sorted by profit impact rather than by service request time. Often, bottlenecks can be caused by simple maintenance issues in a unit. Some profit-impacting items could stay unrepaired for a long time because no one knows the cost of not fixing those items. With multi-tier control system GUIs, maintenance tasks can be easily sorted by their economic impacts, and a new economic-centered automation maintenance framework can be established.

Contribution Values and Costs

Returning to FIG. 2A, as noted above, the process units 202 shown in the planning model 200 generally operate to convert one or more input streams 204 into one or more output streams 206 while creating various intermediate products 208. A master MPC controller 302 or slave MPC controllers 304a-304n could use contribution values and/or contribution costs when performing their control or optimization operations.

Each contribution value may be associated with an intermediate product that is used to produce one or more final products (a final product represents a product output by the process system). A contribution value may be computed using that intermediate product's contribution to each final product and each final product's price. In some embodiments, an intermediate product's contribution value is calculated as:

$$\sum_{i=1}^{n} \text{Contribution}_i(\%) \times \text{ProductPrice}_i - \text{FurtherProcessingCost}_i. \quad (1)$$

Here, n represents the number of final products that can be produced using an intermediate product. Also, Contribution$_i$ represents the percentage of the intermediate product that is dedicated to producing the i$^{th}$ final product, and ProductPrice$_i$ represents the expected or current market price for the i$^{th}$ final product. In addition, FurtherProcessingCost$_i$ represents the additional processing cost needed to produce the i$^{th}$ final product (which may optionally be omitted or set to zero).

In other embodiments, an intermediate product's contribution value is calculated as:

$$\sum_{i=1}^{n} \text{Contribution}_i(\%) \times \text{AdjustedProductPrice}_i - \text{FurtherProcessingCost}_i. \quad (2)$$

Here, the product price for the i$^{th}$ final product can be adjusted to correct for various over-production and under-production scenarios or other situations. For instance, when the projected production of the i$^{th}$ final product exceeds its plan, the final product's price can be decreased to account for storage costs and future order risks. When the projected production of the i$^{th}$ final product is below its plan, the final product's price can be increased if there is a penalty for missing an order deadline.

Note that various adjustments can also be made to the contribution values. For example, when storage is available, a commonly-valuable intermediate product could be stored and saved for the next planning period (rather than reducing its contribution value in the current period). As another example, if an excess intermediate product can be sold on a spot market, a higher contribution value could be assigned to the intermediate product. Further, note that contribution values can be tied together for a current planning period and for the next planning period, which can help to reduce undesirable diminishing horizon effects at the current period's end.

Each contribution cost may be associated with an intermediate product that is produced using one or more feed products (a feed product represents a material input into a process system). A contribution cost may be computed using that intermediate product's use of each feed product and each feed product's price. In some embodiments, an intermediate product's contribution cost is calculated as:

$$\sum_{i=1}^{m} \text{Contribution}_i(\%) \times \text{FeedCost}_i + \text{UpstreamProcessingCost}_i. \quad (3)$$

Here, m represents the number of feed products used to produce an intermediate product. Also, Contribution$_i$ represents the percentage of the i$^{th}$ feed product that is dedicated to producing the intermediate product, and FeedCost$_i$ represents the expected or current market price for the i$^{th}$ feed product. In addition, UpstreamProcessingCost$_i$ represents the processing costs needed to process the i$^{th}$ feed product and produce the intermediate product (which may optionally be omitted or set to zero).

In other embodiments, an intermediate product's contribution cost is calculated as:

$$\sum_{i=1}^{m} \text{Contribution}_i(\%) \times \text{AdjustedFeedCost}_i + \text{UpstreamProcessingCost}_i. \quad (4)$$

Here, the cost for the i$^{th}$ feed product can be adjusted to correct for various over-production and under-production scenarios or other situations. For instance, when the projected inventory of the i$^{th}$ feed product exceeds its plan or storage capacity, its adjusted cost can be decreased to promote consumption. When the projected inventory of the i$^{th}$ feed product falls below its plan or storage capacity, its adjusted cost can be increased to reduce consumption. Note that various adjustments can also be made to the contribution costs. For example, when the adjusted cost of a feed product is greater than its spot market price, a "make versus buy" analysis could be used to determine whether it would be more economical to purchase an intermediate product instead of producing it.

Figure 6:
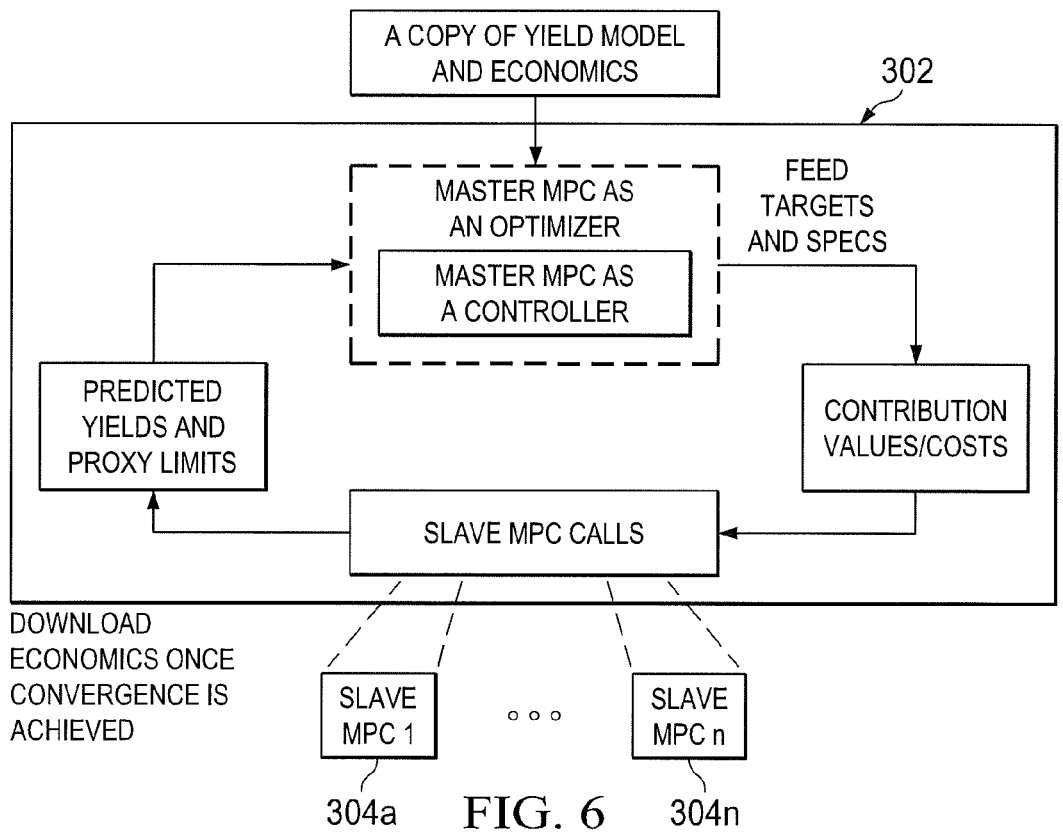
FIG. 6 illustrates an example technique for using contribution values and contribution costs with a cascaded MPC architecture according to this disclosure.

FIG. 6 illustrates an example technique for using contribution values and contribution costs with a cascaded MPC architecture according to this disclosure. In this example, the master MPC controller 302 operates to iteratively identify (i) contribution values and contribution costs based on its planning model, its economics, and data from prior iterations and (ii) predicted yields based on the contribution values and costs and proxy values. The contribution values and contribution costs can be provided to the slave MPC controllers for their local optimization needs. Once an optimal solution (such as an optimized plan) is found, the master MPC controller 302 provides optimized economics to the slave MPC controllers 304a-304n. Additional details regarding the operations of the master MPC controller 302 with respect to using contribution values can be found in U.S. Patent Application Publication No. 2011/0040399 (which is hereby incorporated by reference in its entirety).

Example Planning Model Structures

In some embodiments, a planning model 200 for a master MPC controller 302 can be formed using one or more base models. For example, two base models (a processing unit model and a pool tank model) could be provided for forming planning models. A processing unit can be modeled as one or more input feeds and one or more output feeds. A pool tank can be modeled as a mixing tank or a non-mixing (simple storage) tank. Note that other or additional base models could be used depending on the implementation.

Figure 7:
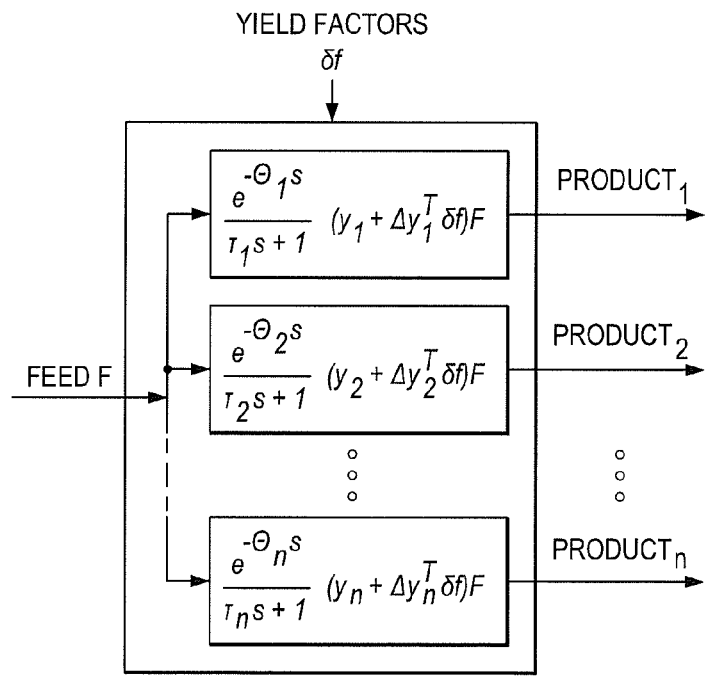
FIGS. 7 through 9 illustrate example base models for forming a planning model in a cascaded MPC architecture according to this disclosure.
Figure 8:
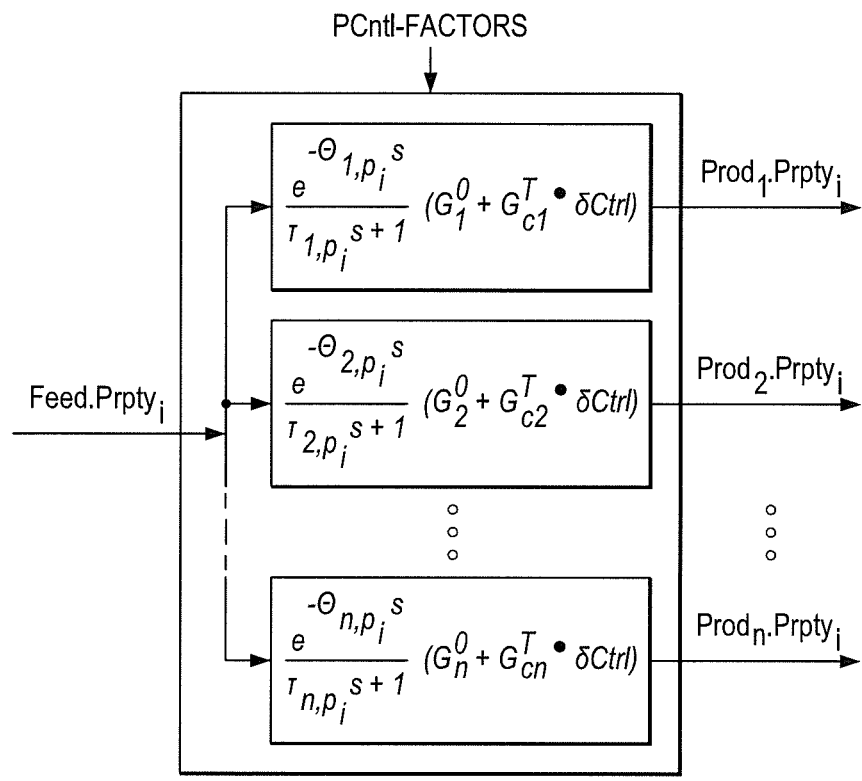
Figure 9:
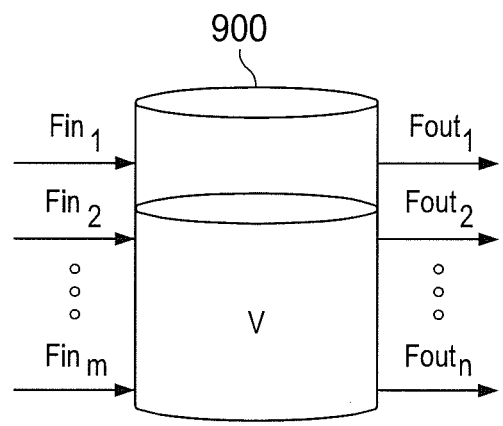

FIGS. 7 through 9 illustrate example base models for forming a planning model in a cascaded MPC architecture according to this disclosure. FIGS. 7 and 8 illustrate an example model for a processing unit, while FIG. 9 illustrates an example model for a pool tank.

As shown in FIG. 7, the following transfer function can be used for material balance between an input feed and multiple output products:

$$\frac{e^{-\theta_i s}}{\tau_i s + 1}(y_i + \Delta y_i^T \delta f)F \quad (5)$$

Here, $y_i$ is the base yield for the i$^{th}$ product, and $\Delta y_i$ is a vector (of $m_1$ elements). Also:

$$\sum_{i=1}^{n} y_i = 1 + vg \quad (6)$$

where vg is the volume gain and where:

$$\sum_{i=1}^{n} \Delta y_{i,j} \cong 0, \quad (7)$$

-continued

∀ any index j

This model format matches with the structure commonly used in planning models. Strictly speaking, it is not a linear model as it has linear dynamics with quadratic gains. The model has a single input feed per unit, and each property of an output product has a similar time-constant and delay as the product draw. Table 2 illustrates a steady-state gain matrix for a single feed flow, although multiple feeds can be naturally extended using the same approach.

where $G_{cj}$ is a vector (of $m_2$ elements) and $G^0_j$ is a "passing thru" DV gain. This approach assumes that each property of a product has a similar time-constant and delay as the product draw, and by default they can be set to the same value. This approach also assumes that the properties can be influenced (or controlled) by an MPC controller. Table 3 illustrates a steady-state gain matrix for both material flow and properties of a single feed, although again multiple feeds can be naturally extended using the same approach.

TABLE 3

| | | (1 + $m_1$ + $m_2$) MVs | | | DVs | |
|---|---|---|---|---|---|---|
| | | Feed | Y-factors$_{(1...m1)}$ | pCtrl-factors$_{(1...m2)}$ | Feed · Prpty | Recycles (reserve) |
| n CVs | Prod$_1$ · Flow | Lumped yield y$_1$ | F · Δyield$_1$ · $_{(1...m_1)}$ | F · Δyield$_1$ · $_{(1...m_2)}$ | | |
| | ... | | | | | DV Gains |
| | Prod$_n$ · Flow | Lumped yield y$_n$ | F · Δyield$_n$ · $_{(1...m_1)}$ | F · Δyield$_n$ · $_{(1...m_2)}$ | | |
| n × r CVs | Prod$_1$ · Prpty$_1$ | | Gains (conv → prpty) | Gains (pCtrl → prpty) | | |
| | ... | | ... | ... | $G_{lumped}^0$ | |
| | Prod$_n$ · Prpty$_r$ | | Gains (conv → prpty) | Gains (pCtrl → prpty) | | |

TABLE 2

| | | (1 + $m_1$) MVs | |
|---|---|---|---|
| | | Feed (F) | Y-factors$_{(1 ... m1)}$ |
| n CVs | Prod$_1$ · Flow | Lumped yield y$_1$ | F · Δyield$_1$ · $_{(1 ... m_1)}$ |
| | ... | | |
| | Prod$_n$ · Flow | Lumped yield y$_n$ | F · Δyield$_n$ · $_{(1 ... m_1)}$ |
| n × r CVs | Prod$_1$ · Prpty$_1$ | | Gains (y-fac→prpty) |
| | ... | Not time invariant | ... |
| | Prod$_n$ · Prpty$_r$ | | Gains (y-fac→prpty) |

As shown in FIG. 8, the following transfer function can be used for transferring the $i^{th}$ property of an input feed to the $i^{th}$ property of the $i^{th}$ product:

$$\frac{e^{-\theta_{j,p_i}s}}{\tau_{j,p_i}s+1}(G_j^0 + G_{cj}^T \cdot \delta Ctrl) \quad (8)$$

Various techniques can be used to obtain the dynamics of a processing unit model defined in this manner. For example, the dynamics can be estimated from historical data and validated with engineering knowledge, identified during brief step-testing, or estimated during operation. Bias updating and yield validation could also occur, such as when lumped yields (rather than base yields) of a processing unit are updated in real-time. Various error-correction schemes can also be used with master MPC controller planning models. In a first error-correction scheme, the yield can be calculated directly from the input flow, and the average yield (within a past time window) can be estimated and used to predict a future average yield over a similar time window (the width of the window can be tunable). Note that the estimated yield may need to pass an internal predictability threshold (possibly tunable) before the lumped-yield value is updated. Gain updating can improve model prediction accuracy, and a validated gain could have a better predictability on the future lumped yield. In a second error-correction scheme, a bias updating mechanism can be used to update the bias inside the master MPC model prediction.

FIG. 9 illustrates an example modeling of a general pool tank 900. A pool tank 900 denotes a structure used to store material (such as one or more intermediate products) being manufactured in a facility. The storage tanks 210 shown in FIG. 2A above are examples of pool tanks. Multiple streams of materials (Fin) flow into the tank 900, and each stream has r properties. Also, multiple streams of materials (Fout) flow out of the tank 900, and all streams have the same properties. The current volume is denoted V, and an assumption can be made that input streams with similar properties are pooled together in a pool tank 900. Note that the model described below is for tanks used for pooling intermediate products and may or may not be suitable for final product blending. Also note that the input streams can be similar enough so that a linear mixing rule is accurate enough for measurement feedback, although other approaches (such as those using a nonlinear correction term or nonlinear blending laws) could be used.

In the model of the pool tank 900, the following material balance equation could be used:

$$\frac{dV}{dt} = \sum_{i=1}^{m} F_{in_i} - \sum_{i=1}^{n} F_{out_i} \quad (9)$$

The following equations can be used to represent blending of the $i^{th}$ volumetric property:

$$\frac{d(p_j^{Tank} V)}{dt} = \sum_{i=1}^{m} p_{j,i} F_{in_i} - p_j^{Tank} \sum_{i=1}^{n} F_{out_i} \quad (10)$$

$$p_j^{Tank} \frac{dV}{dt} + V \frac{dp_j^{Tank}}{dt} = \sum_{i=1}^{m} p_{j,i} F_{in_i} - p_j^{Tank} \sum_{i=1}^{n} F_{out_i} \quad (11)$$

$$V \frac{dp_j^{Tank}}{dt} = \sum_{i=1}^{m} (p_{j,i} - p_j^{Tank}) F_{in_i} \quad (12)$$

The following can be obtained using Laplace transforms and reorganizing:

$$G_{P_j}(s) = \frac{\sum_{i=1}^{m} p_{j,i} F_{in_i}}{V \cdot s + \sum_{i=1}^{m} F_{in_i}} = \frac{(1/F_{Tin}) \sum_{i=1}^{m} p_{j,i} F_{in_i}}{\tau_v \cdot s + 1} \quad (13)$$

Blending bonuses can also be used in an oil and gas system as follows:

$$G_{P_j}(s) = \frac{(1/F_{Tin}) \left\{ \sum_{i=1}^{m} p_{j,i} F_{in_i} + (1/F_{Tin}) \sum_{i,k} b_{j,k} F_{in_i} F_{in_k} \right\}}{\tau_v \cdot s + 1} \quad (14)$$

Table 4 summarizes the modeling of a general pool tank.

Assumptions here include that the input flows vary more frequently than their properties do and that input-output variables can be adequately measured (either in an automated manner or in a laboratory).

Among other things, the benefits of using base model structures include designing a limited number of base structures (such as two in the example above), where the base structures provide flexibility in terms of how the units and tanks are connected. For example, processing units and pool tanks could be fixed after configuration, and the states of inventory volumes/properties can be tracked dynamically. Connections between processing units and pool tanks could be stateless and changed on-the-fly. Moreover, a planning model for master MPC controllers can be constructed on the fly. In addition, the cascaded architecture can easily take advantage of intermediate feedback as long as intermediate input-output signals can be adequately measured, and this approach can support improved model updating as its structure aligns more naturally with real processing units.

Model Validation Technique

Figure 10:
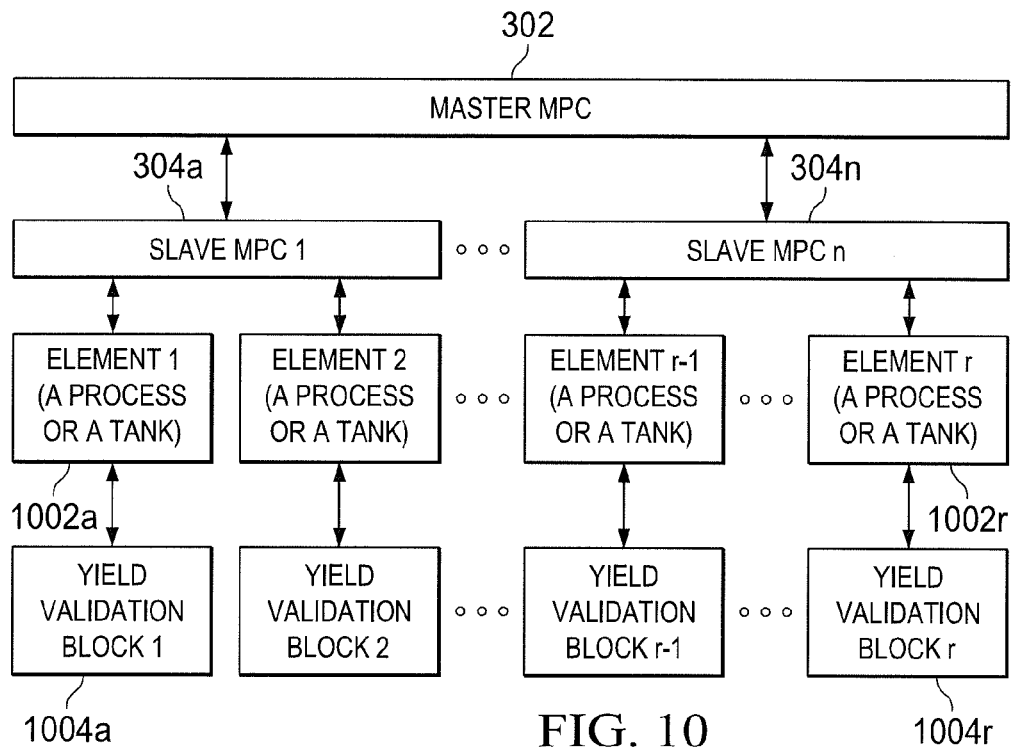
FIG. 10 illustrates an example technique for validating a planning model in a cascaded MPC architecture according to this disclosure.

A master MPC controller 302 or other component of a control and automation system can implement a validation technique in order to validate a planning model to be used by the master MPC controller 302. FIG. 10 illustrates an example technique for validating a planning model in a cascaded MPC architecture according to this disclosure. In FIG. 10, a hierarchy of controllers and other devices is shown, where each slave MPC controller 304a-304n is associated with at least one process element (a processing unit or a pool tank) 1002a-1002r. Each process element 1002a-1002r has an associated yield validation block 1004a-1004r, respectively.

Among other things, the yield validation blocks 1004a-1004r support model validation involving envelope calculations of material balances, energy balances, product properties or other modeling updates. A planning model can be validated by checking that material, energy, or other factors are balanced in the model. Envelope calculations can be done in weight or equivalent values, and the results can be presented in different units based on the user's choice (such as weight or volume). Temperature/density correction factors can be used, and values can be converted to common units (such as barrels or tons). The conventions commonly used in material accounting in a specific industry could be supported.

Various other design issues can be considered in the validation. For example, some measurements can be intermittent, incomplete, non-periodic, missing, delayed, or partly nonexistent, and a scheme (such as filtering or bias-

TABLE 4

| | $Fin_{(1...m)}$ | $Fout_{(1...n)}$ | $Fin_{(1...m)} \cdot Prpty_1$ | $Fin_{(1...m)} \cdot Prpty_r$ |
|---|---|---|---|---|
| Level | / | \ | | |
| Tank-Prpty$_1$ | $\dfrac{P_{1 \cdot (1...m)}}{V \cdot s + \sum_{i=1}^{m} F_{in_i}}$ | | $\dfrac{Fin_{(1...m)}}{V \cdot s + \sum_{i=1}^{m} F_{in_i}}$ | |
| . | | | | |
| . | | | | |
| . | | | | |
| Tank-Prpty$_r$ | $\dfrac{P_{r \cdot (1...m)}}{V \cdot s + \sum_{i=1}^{m} F_{in_i}}$ | | | $\dfrac{Fin_{(1...m)}}{V \cdot s + \sum_{i=1}^{m} F_{in_i}}$ | updating) can be used for dealing with such anomalies. Also, in some cases, material may not be balanceable when there is an (unplanned or unmeasured) off-specification material recycle, which could be handled in any suitable manner (such as based on user input). In addition, the yields of some streams may differ significantly from their "normal" values for a period of time due to maintenance or abnormal process conditions, which again could be handled in any suitable manner (such as based on user input).

The yield validation blocks 1004a-1004r can also support bias updating and yield validation of lumped yields as described above. For example, the yield validation blocks 1004a-1004r could measure real-time yields and cross-validate them by applying material balance and volume/temperature corrections. The yield validation blocks 1004a-1004r could also perform the first error-correction scheme described above.

Techniques for Handling Master-Slave Variables

The proxy limits described above allow constraints from slave MPC controllers 304a-304n to be passed to a master MPC controller 302. FIGS. 11 through 16 illustrate an example technique for linking variables in a master MPC controller and slave MPC controllers in a cascaded MPC architecture according to this disclosure. This technique allows the master MPC controller 302 to consider the constraints of the slave MPC controllers 304a-304n during its operation. Note, however, that other approaches could be used.

Figure 11:
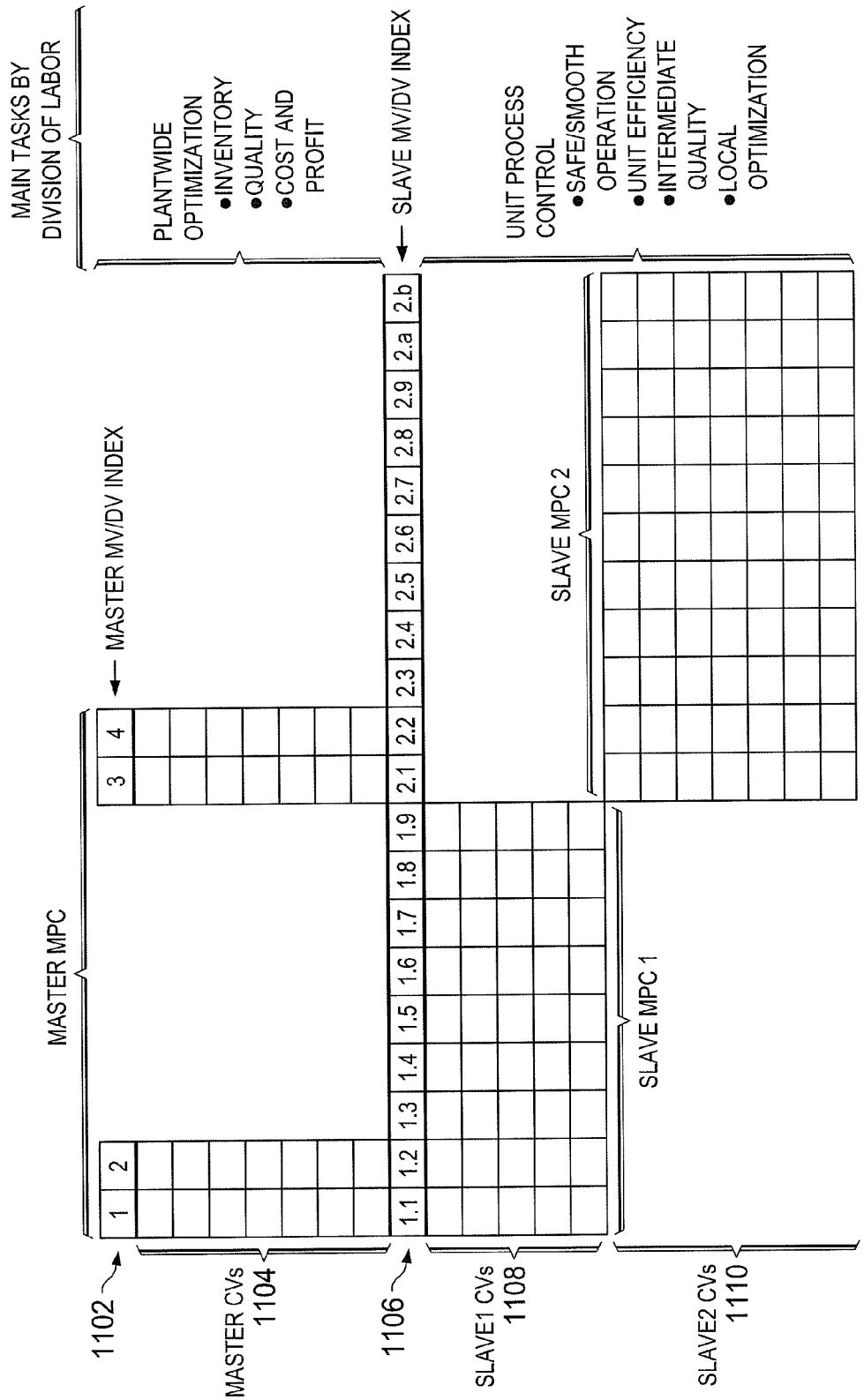

As shown in FIG. 11, the master MPC controller 302 has an MV/DV index 1102 that identifies different MVs or DVs used by the master MPC controller 302. Various CVs 1104 controlled by the master MPC controller 302 can be affected by those MVs or DVs. There is also an MV/DV index 1106 that identifies different MVs or DVs used by the slave MPC controllers 304a-304b. Various CVs 1108-1110 controlled by the slave MPC controllers 304a-304b can be affected by those MVs or DVs. A conjoint variable represents the same variable in both a master MPC controller and a slave MPC controller (such as MV4 in the master controller and MV9 in the slave controller as described above). Conjoint variables can be configured as either MVs or DVs in master and slave MPC controllers.

Master and slave CV constraints can be coupled by associating a value in the MV/DV index 1102 with a corresponding value in the MV/DV index 1106. This indicates that the variable identified by the MV/DV index 1102 and the MV/DV index 1106 is a conjoint variable. This allows the plantwide optimization of the master MPC controller 302 to include some or all of the CV constraints from the slave MPC controllers 304a-304b.

Figure 12:
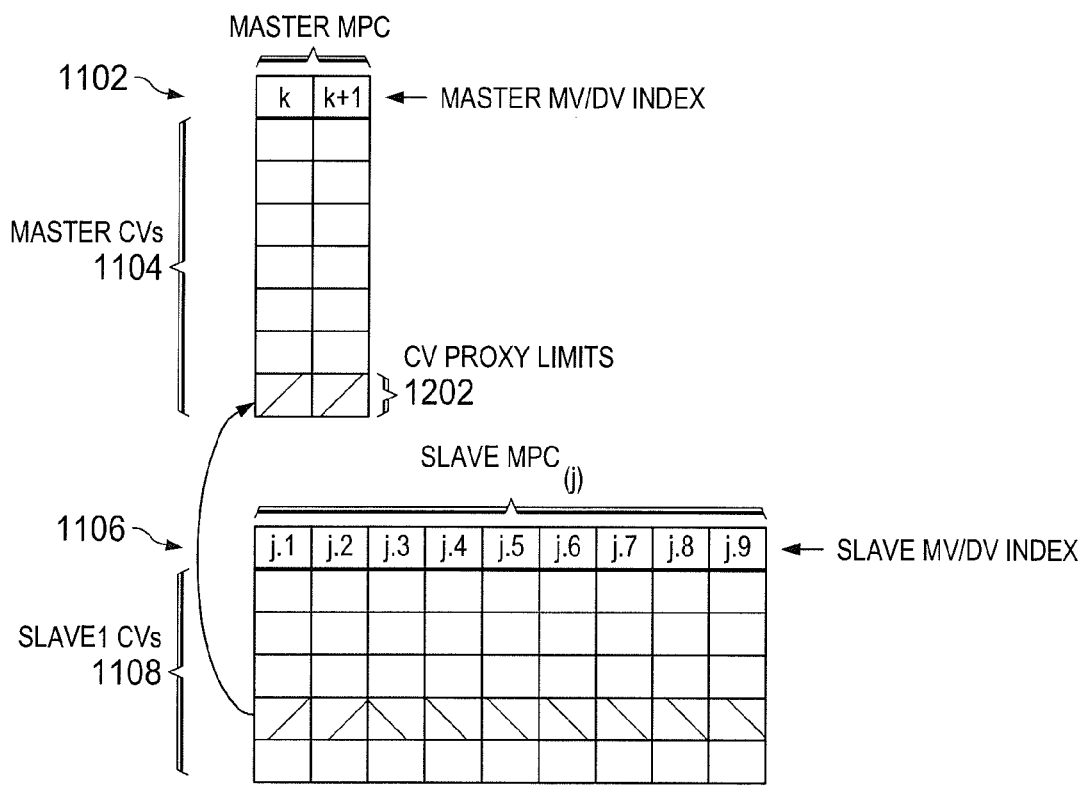
FIGS. 11 through 16 illustrate an example technique for linking variables in a master MPC controller and slave MPC controllers in a cascaded MPC architecture according to this disclosure.

As shown in FIG. 12, at least one CV of a slave MPC controller can be "elevated" to a master MPC controller via a proxy limit. The proxy limit appears in the column(s) of the MV/DV index 1102 associated with the corresponding column(s) of the MV/DV index 1106. For example, assume a CV constraint in the slave MPC controller is expressed as:

$$\underline{CV_i} \le \sum_{l=1}^{n} a_{i,l} x_l \le \overline{CV_i} \quad (15)$$

This CV constraint can be used as a CV proxy limit in the master MPC controller using the expression:

$$\min_{x_{free}} \{\underline{CV_i} - \sum a_{i,free} x_{free}\} \le \quad (16)$$

-continued
$$\sum a_{i,c} x_{conjoint} \le \max_{x_{free}} \{\overline{CV_i} - \sum a_{i,free} x_{free}\}$$

This represents one example way in which the constraint of a slave MPC controller can be passed to and used by a master MPC controller.

Figure 13:
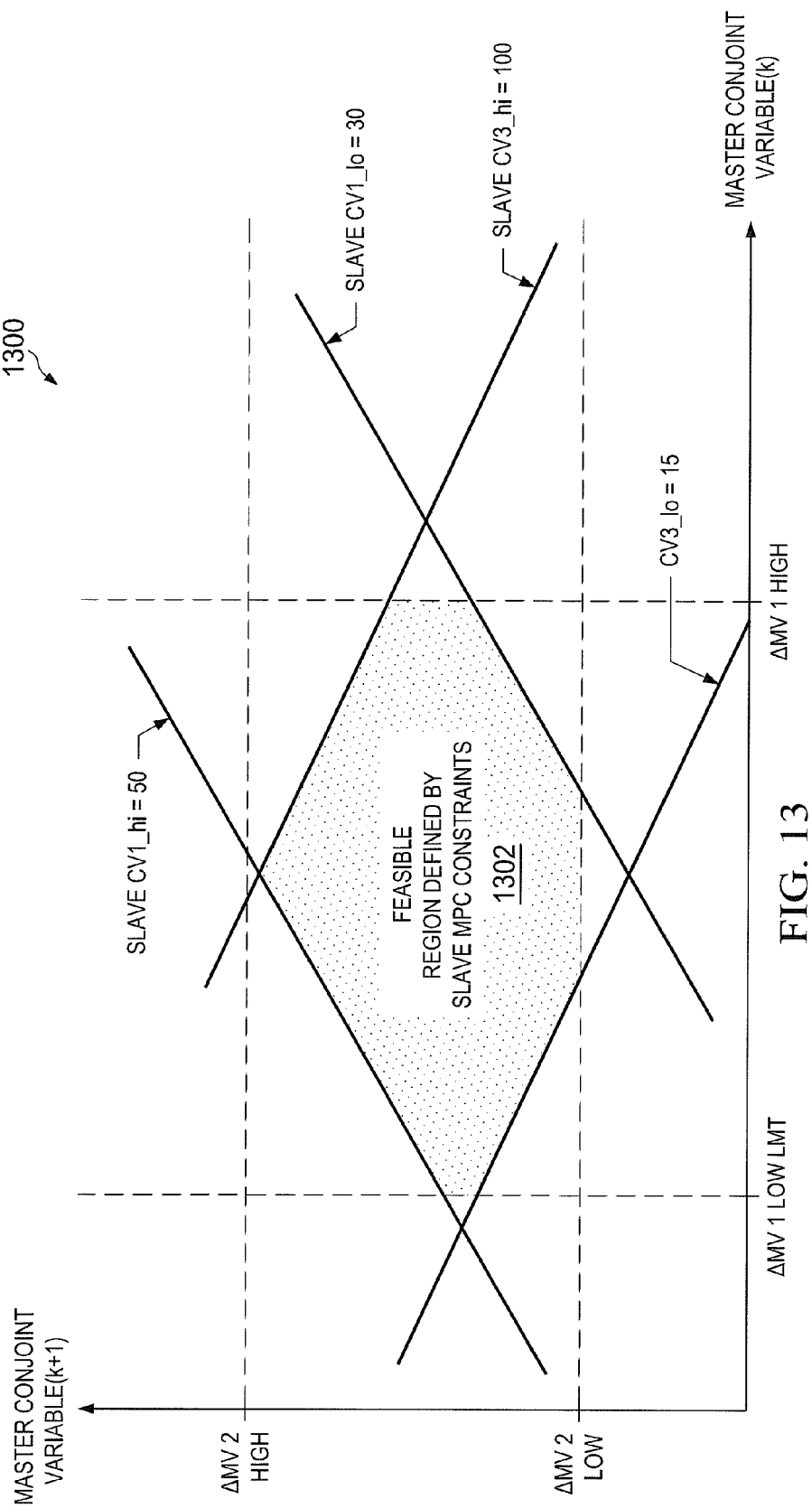
Figure 14:
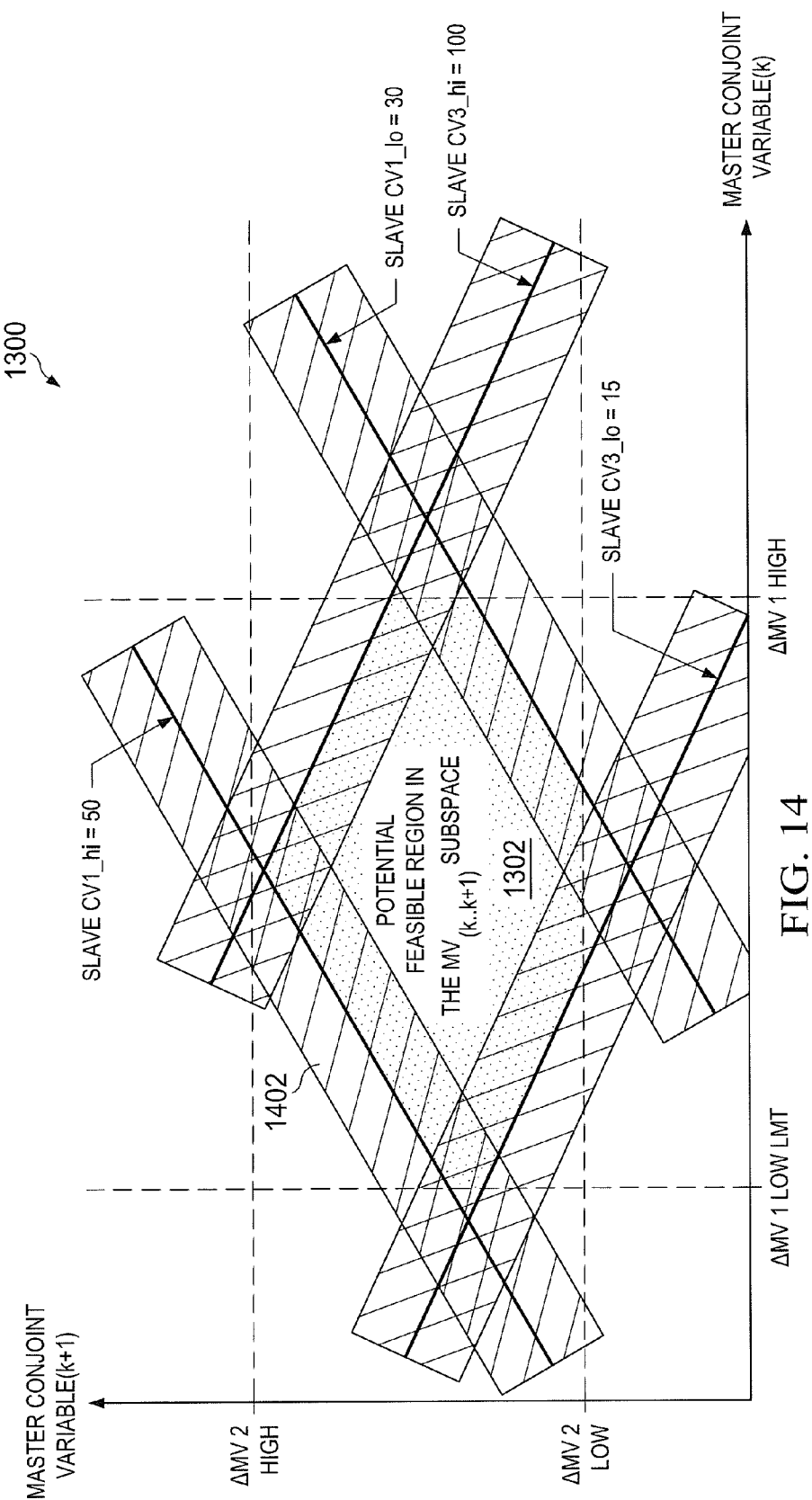

The constraint of a slave MPC controller could be incorporated into the planning operations of a master MPC controller in any suitable manner. For example, FIG. 13 shows that if the free MVs of a slave MPC controller are fixed at their current values, the slave controller's CV constraints can be plotted in the master controller's MV space 1300. The slave controller's MV limits appear as simple bounds in the master controller's MV space 1300, and the slave controller's CV limits appear as linear constraints in general. A feasibility region 1302 between these limits defines the possible combinations of values that could be selected by the master MPC controller while satisfying all constraints of the slave MPC controllers. The shape of the feasibility region 1302 defined by the slave controller's constraints is generally a polygon or polyhedron. As shown in FIG. 14, if the free MVs of the slave MPC controller take other values (for any reason), the shape of the feasibility region 1302 changes. The shaded bars 1402 indicate how these constraints may shift. Similarly, if the slave controller's model gains are updated on-the-fly, the slope of these CV constraints may change accordingly.

Figure 15:
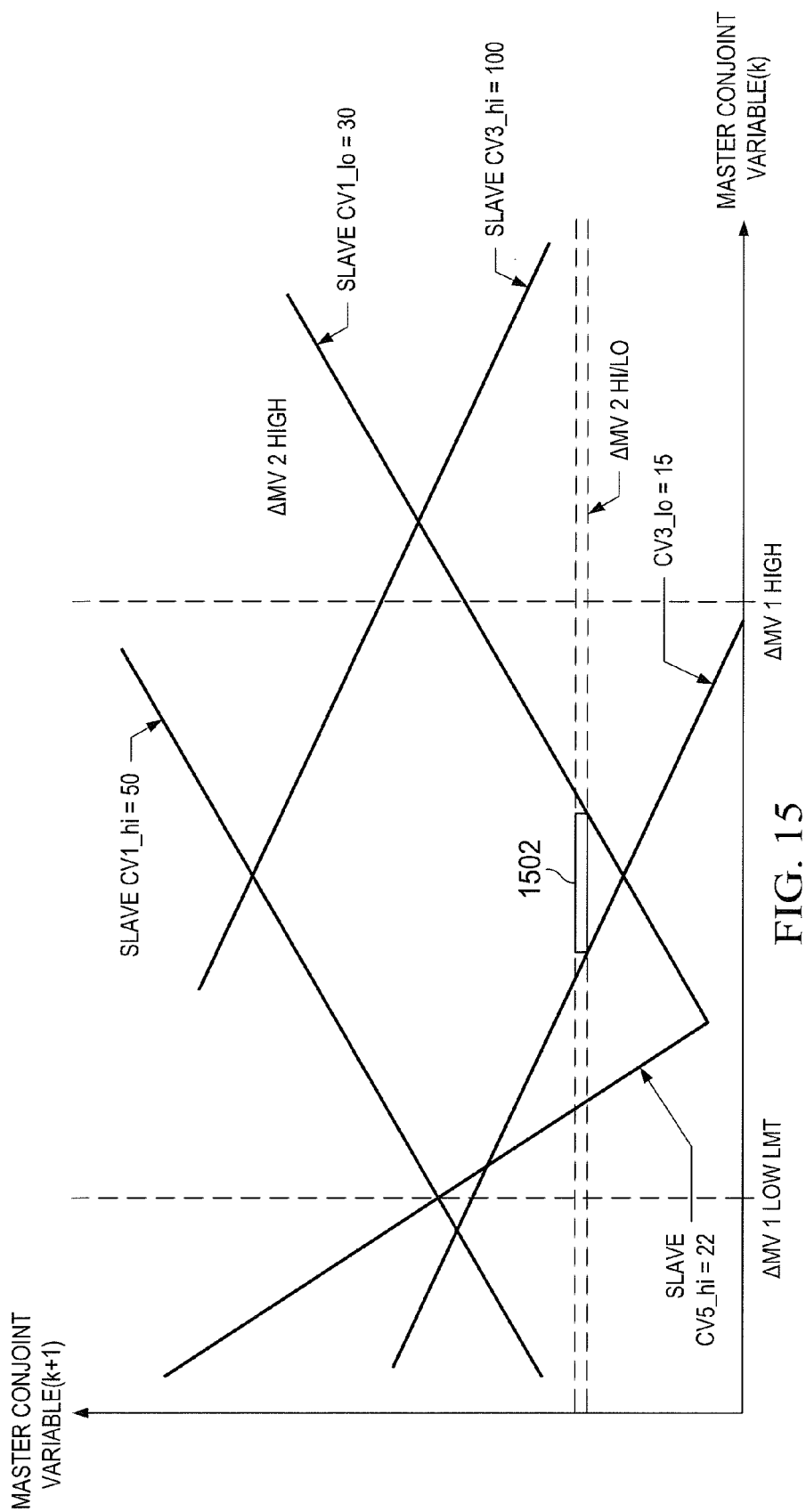

If there is a single conjoint variable between a master MPC controller and a slave MPC controller, the feasibility region 1302 can be reduced in size, such as to the feasibility region 1502 shown in FIG. 15. This can be accomplished when there is a desire to push a MV/DV of the master MPC controller in a given direction by making small changes at a time. In that case, only a narrow band of the feasibility space is used. The high and low values of this feasibility region 1502 can be calculated by finding suitable locations for the free slave controller's MVs. The maximum high value can be computed by an optimization call from the master controller for the slave controller to maximize its MV2 value. The minimum low value can be computed by an optimization call from the master controller for the slave controller to minimize its MV2 value. The maximizing objective function can be augmented to include the contribution values of products and other local optimizing components. With contribution values, a unit can be pushed to a more profitable yield profile.

Figure 16:
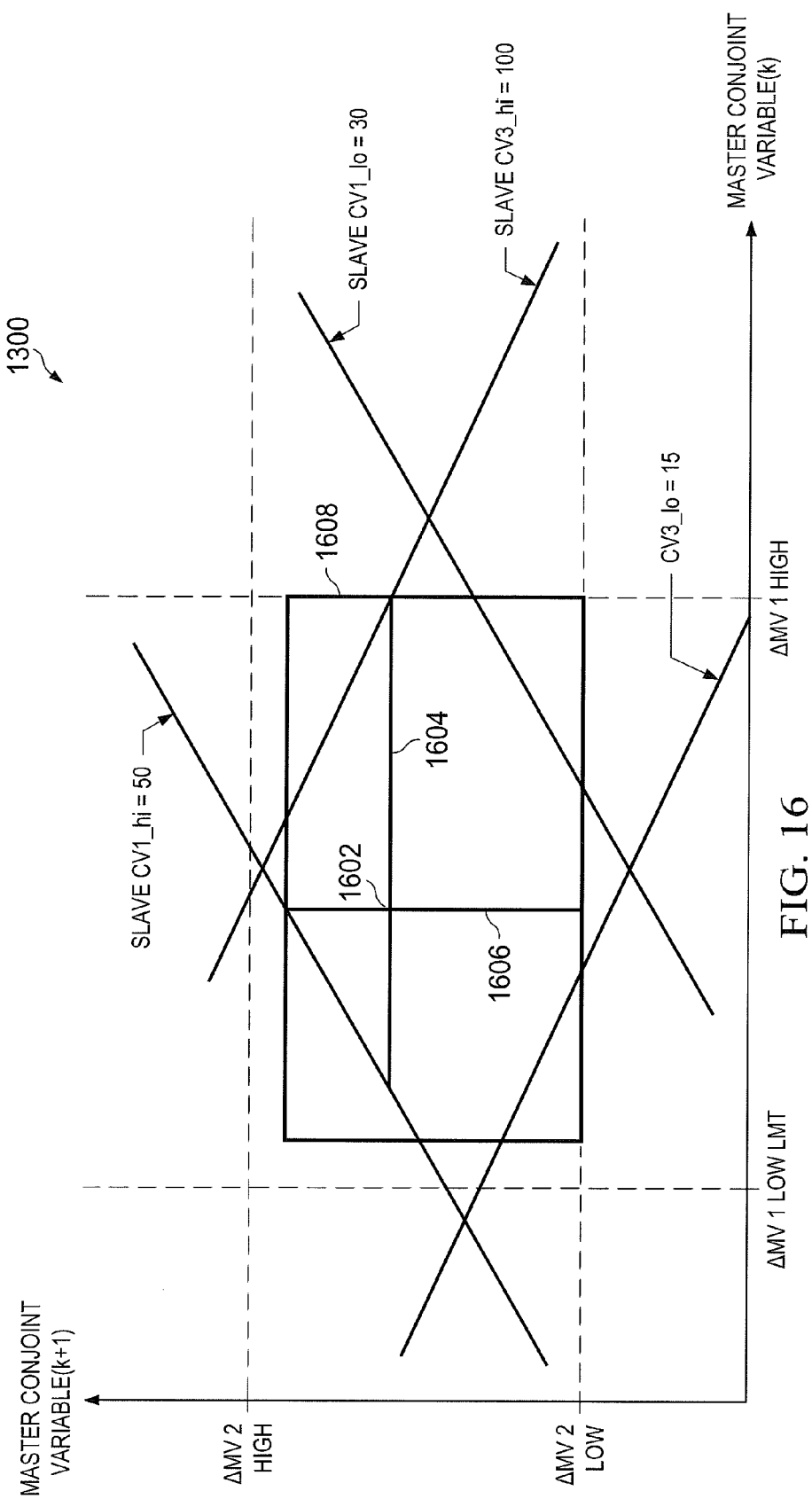

If there are two conjoint variables between a master MPC controller and a slave MPC controller, a feasibility region can be defined as shown in FIG. 16. At the current MV point 1602 (which in this example is the origin), the master MPC controller could estimate one horizontal feasible bar 1604 and one vertical feasible bar 1606. This could occur in the same manner as shown in FIG. 15. The width of each bar could be increased until it reaches both ends of the other bar, which forms a rectangular area 1608 creating an initial representation of a feasibility region. However, the corners of the rectangular area 1608 represent infeasible areas since they are outside the slave MPC controller's constraints. Various approaches can be used to trim the corners of the rectangular area 1608 if needed. For example, the slave controller's CV constraints that are close to the current MV point or the last optimal point can be selected, and a 1×2 constraint row can be appended to the master controller's constraint set for each selected slave CV constraint. As an example, the 1×2 row can be copied from the slave controller's MPC matrix (the selected row and 2 conjoint MVs' columns). The slave controller's optimizer can be called to maximize or minimize the selected CV by maximizing the CV high constraint and minimizing the CV low constraint.

Note that while only one or two conjoint variables are described above, the approach described here could be extended to any number of conjoint variables. This approach allows the master MPC controller to consider the constraints of its slave MPC controllers while optimizing operations of a plant with a feasibility region defined by those constraints.

Example Methodology

Figure 17:
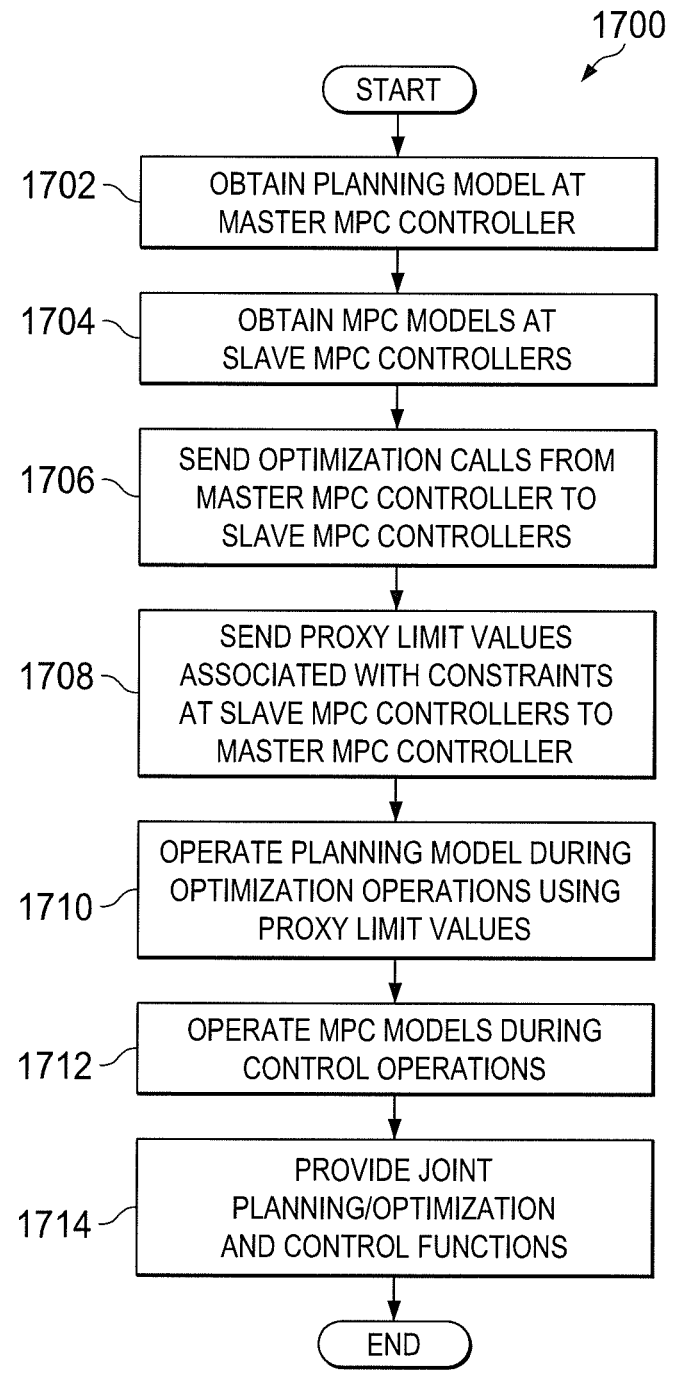
FIG. 17 illustrates an example method for using cascaded MPC controllers in an industrial process control and automation system according to this disclosure.

FIG. 17 illustrates an example method 1700 for using cascaded MPC controllers in an industrial process control and automation system according to this disclosure. For ease of explanation, the method 1700 is described with respect to the cascaded MPC architecture 300, which could operate in the control and automation system 100. The method 1700 could be used with any other suitable cascaded MPC architecture and in any other suitable system.

As shown in FIG. 17, a planning model is obtained at a master MPC controller at step 1702, and MPC models are obtained at slave MPC controllers at step 1704. This could include, for example, generating a planning model 200 or re-using an existing planning model 200, such as a single-period planning model. This could also include generating MPC models 250, such as by using standard techniques.

During operation of the cascaded MPC architecture, optimization calls are sent from the master MPC controller to the slave MPC controllers at step 1706. The optimization calls could request that the slave MPC controllers determine whether (and to what extent) certain changes could be made to their MV values without violating their constraints. The slave MPC controllers respond by sending proxy limit values associated with their constraints to the master MPC controller at step 1708. This could include, for example, the slave MPC controllers identifying to what extent certain changes could be made to their MV values and which constraints might be violated.

The planning model is operated by the master MPC controller during optimization operations using the proxy limit values at step 1710. This could include, for example, the master MPC controller combining the proxy limit values from multiple slave MPC controllers in the master MPC controller's control and economic optimization formulations. At the same time, the MPC models are operated by the slave MPC controllers during control operations at step 1712. This could include, for example, the slave MPC controllers performing standard MPC functions, where those functions are based on the control and economic optimization formulations generated by the master MPC controller. In this way, joint planning/optimization and control functions can occur in the control and automation system at step 1714.

Although FIG. 17 illustrates one example of a method 1700 for using cascaded MPC controllers in an industrial process control and automation system, various changes may be made to FIG. 17. For example, while shown as a series of steps, various steps in FIG. 17 could overlap, occur in parallel, occur in a different order, or occur any number of times.

CONCLUSION

This disclosure has provided a novel cascaded MPC architecture, which closes the gap between planning and control. The architecture includes a master MPC controller cascaded over one or more slave MPC controllers, such as slave MPC controllers at the unit level. The master MPC controller uses a planning model, such as to control production inventories, manufacturing activities, and product qualities inside a plant. The slave MPC controllers provide the master MPC controller with their future predictions and operating constraints, such as via proxy limits. A real-time planning solution embedded in a multi-tier MPC cascade honors the lower-level operating constraints and no longer needs to be manually translated. By cross-leveraging both planning and control models online, the MPC cascade architecture makes it possible to run plantwide optimization within a closed-loop control system in real-time and automatically carry out just-in-time production plans through the slave MPC controllers.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining a planning model for an industrial facility at a master model predictive control (MPC) controller;
sending at least one optimization call from the master MPC controller to one or more slave MPC controllers;
receiving at least one proxy limit value from the one or more slave MPC controllers at the master MPC controller in response to the at least one optimization call, wherein the at least one proxy limit value identifies to what extent one or more process variables controlled by the one or more slave MPC controllers are adjustable without violating any process variable constraints; and
performing plantwide optimization at the master MPC controller using the planning model and the at least one proxy limit value, wherein the at least one proxy limit value allows the master MPC controller to honor the process variable constraints of the one or more slave MPC controllers during the plantwide optimization.

2. The method of claim 1, wherein receiving the at least one proxy limit value comprises receiving at least one proxy limit value that is based on one or more MPC models used by the one or more slave MPC controllers.

3. The method of claim 2, wherein:
the planning model identifies multiple units in the industrial facility and material flows between the units; and
each MPC model identifies multiple components of a single unit in the industrial facility, actuators used to control the multiple components of the single unit, and process controllers used to control the actuators.

4. The method of claim 1, wherein each proxy limit value identifies a maximum or minimum value obtainable for one process variable without violating any process variable constraints.

5. The method of claim 1, wherein the master MPC controller during the plantwide optimization generates a real-time planning solution within a closed-loop control system.

6. The method of claim 1, further comprising:
generating a graphical user interface identifying different portions of the industrial facility;
using the at least one proxy limit value to identify one or more bottlenecks within the industrial facility, each bottleneck associated with the slave MPC controller whose proxy limit value is constraining the plantwide optimization; and
displaying a first indicator in the graphical user interface for each portion of the industrial facility creating the one or more bottlenecks.

7. The method of claim 6, further comprising:
upon selection of one of the different portions of the industrial facility, displaying an MPC model associated with the selected portion of the industrial facility;
upon selection of a process controller within the MPC model, displaying a table showing controlled and manipulated variables associated with the selected process controller; and
displaying a second indicator in the graphical user interface for each controlled or manipulated variable that is constraining the plantwide optimization.

8. The method of claim 1, further comprising:
creating the planning model using multiple base models;
wherein a first type of base model models a processing unit in the industrial facility as one or more input feeds and one or more output feeds; and
wherein a second type of base model models a pool or storage tank.

9. The method of claim 1, wherein:
the industrial facility is used to produce multiple intermediate products during production of multiple final products using multiple feed products;
the master MPC controller is configured to generate contribution values and contribution costs for the one or more slave MPC controllers;
each contribution value is based on one intermediate product's contribution to the final products; and
each contribution cost is based on one intermediate product's production using the feed products.

10. The method of claim 1, wherein the master MPC controller sends optimization calls to multiple slave MPC controllers and receives proxy limit values from the multiple slave MPC controllers.

11. An apparatus comprising:
a master model predictive control (MPC) controller comprising:
at least one memory configured to store a planning model for an industrial facility;
at least one network interface configured to communicate with one or more slave MPC controllers; and
at least one processing device configured to:
initiate transmission of at least one optimization call to the one or more slave MPC controllers;
receive at least one proxy limit value from the one or more slave MPC controllers in response to the at least one optimization call, wherein the at least one proxy limit value identifies to what extent one or more process variables controlled by the one or more slave MPC controllers are adjustable without violating any process variable constraints; and
perform plantwide optimization using the planning model and the at least one proxy limit value, wherein the at least one processing device is configured to honor the process variable constraints of the one or more slave MPC controllers during the plantwide optimization using the at least one proxy limit value.

12. The apparatus of claim 11, wherein the at least one proxy limit value is based on one or more MPC models used by the one or more slave MPC controllers.

13. The apparatus of claim 11, wherein the planning model identifies multiple units in the industrial facility and material flows between the units.

14. The apparatus of claim 11, wherein each proxy limit value identifies a maximum or minimum value obtainable for one process variable without violating any process variable constraints.

15. The apparatus of claim 11, wherein the at least one processing device is further configured to:
generate a graphical user interface identifying different portions of the industrial facility;
use the at least one proxy limit value to identify one or more bottlenecks within the industrial facility, each bottleneck associated with the slave MPC controller whose proxy limit value is constraining the plantwide optimization; and
display a first indicator in the graphical user interface for each portion of the industrial facility creating the one or more bottlenecks.

16. The apparatus of claim 15, wherein the at least one processing device is further configured to:
upon selection of one of the different portions of the industrial facility, display an MPC model associated with the selected portion of the industrial facility;

upon selection of a process controller within the MPC model, display a table showing controlled and manipulated variables associated with the selected process controller; and display a second indicator in the graphical user interface for each controlled or manipulated variable that is constraining the plantwide optimization.

17. A non-transitory computer readable medium embodying a computer program, the computer program comprising computer readable program code that when executed causes at least one processing device to:

obtain a planning model for an industrial facility at a master model predictive control (MPC) controller;

send at least one optimization call from the master MPC controller to one or more slave MPC controllers;

receive at least one proxy limit value from the one or more slave MPC controllers at the master MPC controller in response to the at least one optimization call, wherein the at least one proxy limit value identifies to what extent one or more process variables controlled by the one or more slave MPC controllers are adjustable without violating any process variable constraints; and perform plantwide optimization at the master MPC controller using the planning model and the at least one proxy limit value, wherein the at least one proxy limit value allows the master MPC controller to honor the process variable constraints of the one or more slave MPC controllers during the plantwide optimization.

18. The computer readable medium of claim 17, wherein:

the planning model identifies multiple units in the industrial facility and material flows between the units; and each proxy limit value identifies a maximum or minimum value obtainable for one process variable without violating any process variable constraints.

19. The computer readable medium of claim 17, wherein the computer program further comprises computer readable program code that when executed causes the at least one processing device to:

generate a graphical user interface identifying different portions of the industrial facility;

use the at least one proxy limit value to identify one or more bottlenecks within the industrial facility, each bottleneck associated with the slave MPC controller whose proxy limit value is constraining the plantwide optimization; and display a first indicator in the graphical user interface for each portion of the industrial facility creating the one or more bottlenecks.

20. The computer readable medium of claim 19, wherein the computer program further comprises computer readable program code that when executed causes the at least one processing device to:

upon selection of one of the different portions of the industrial facility, display an MPC model associated with the selected portion of the industrial facility;

upon selection of a process controller within the MPC model, display a table showing controlled and manipulated variables associated with the selected process controller; and display a second indicator in the graphical user interface for each controlled or manipulated variable that is constraining the plantwide optimization.

* * * * *